(12) United States Patent
Hedayat et al.

(10) Patent No.: US 12,052,756 B2
(45) Date of Patent: Jul. 30, 2024

(54) ENHANCED IMPLEMENTATION OF A RANDOM ACCESS CHANNEL

(71) Applicant: Charter Communications Operating, LLC, St. Louis, MO (US)

(72) Inventors: Ahmad Reza Hedayat, Carlsbad, CA (US); Amitav Mukherjee, Elk Grove, CA (US); Maulik V. Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 252 days.

(21) Appl. No.: 17/519,094

(22) Filed: Nov. 4, 2021

(65) Prior Publication Data
US 2022/0061091 A1 Feb. 24, 2022

Related U.S. Application Data

(62) Division of application No. 16/541,855, filed on Aug. 15, 2019, now Pat. No. 11,219,063.

(51) Int. Cl.
*H04W 74/0808* (2024.01)
*H04W 16/14* (2009.01)
(Continued)

(52) U.S. Cl.
CPC ....... *H04W 74/0808* (2013.01); *H04W 16/14* (2013.01); *H04W 48/14* (2013.01); *H04W 72/0466* (2013.01); *H04W 72/23* (2023.01)

(58) Field of Classification Search
CPC . H04W 74/0808; H04W 16/14; H04W 48/14; H04W 72/0468; H04W 72/23
See application file for complete search history.

(56) References Cited

U.S. PATENT DOCUMENTS

2016/0345351 A1 11/2016 Bhattacharjee et al.
2017/0019928 A1 1/2017 Viraraghavan
(Continued)

FOREIGN PATENT DOCUMENTS

WO WO-2016122784 A1 * 8/2016 ........... H04L 1/1887

OTHER PUBLICATIONS

Annex to Form PCT/ISA/206, Communication Relating to the Results of the Partial International Search/PCT/US2020/045738, dated Oct. 2, 2020, p. 3-17.
(Continued)

*Primary Examiner* — Mohammad S Anwar
(74) *Attorney, Agent, or Firm* — Armis IP Law, LLC

(57) ABSTRACT

According to one configuration, a system includes a mobile communication device in communication with a wireless base station. During operation, the mobile communication device detects one or more conditions associated with the wireless network environment. Based on the one or more detected conditions, the mobile communication device selects amongst multiple channel access procedures to communicate with the wireless base station and establish a wireless communication link. The mobile communication device can be configured to include supplemental data in a message to the wireless base station to indicate a reason for the mobile communication device selecting a particular channel access procedure of the multiple channel access procedures.

18 Claims, 14 Drawing Sheets

(51) Int. Cl.
*H04W 48/14* (2009.01)
*H04W 72/044* (2023.01)
*H04W 72/23* (2023.01)

(56) References Cited

U.S. PATENT DOCUMENTS

| | | |
|---|---|---|
| 2017/0303303 A1 | 10/2017 | Yang et al. |
| 2018/0027594 A1 | 1/2018 | Nagaraja et al. |
| 2018/0110074 A1 | 4/2018 | Akkarakaran et al. |
| 2018/0110075 A1 | 4/2018 | Ly et al. |
| 2019/0342912 A1 | 11/2019 | Priyanto et al. |

OTHER PUBLICATIONS

Fujitsu, "On procedure selection among 2-step and 4-step RACH", 3GPP Draft; R2-1906256 On Procedure Selection Among 2-Step and 4-Step Rach, 3rd Generation Partnership Project (3GPP), Mobile Competence Centre; 650, Route Des Lucioles; F-06921 Sophia-Antipolis Ced, vol. RAN WG2, No. Reno, USA; May 13, 2019-May 17, 2019, May 13, 2019 (May 13, 2019), XP051729726.

International Search Report, PCT/US2020/045742, Oct. 7, 2020, pp. 1-14.

Nokia et al: "2-step RACH Procedure Feature Lead Summary", 3GPP Draft; RI-1907726 2-STEP Rach Procedure Feature Lead Summary RAN1#97, 3rd Generation Partnership Project (3GPP), Mobile Competence Centre; 650, Route Des Lucioles; F-06921 Sophia-Antipolis Cede, vol. RAN WG1, No. Reno, USA; May 13, 2019-May 17, 2019, May 16, 2019 (May 16, 2019), XP051740005.

Nomor Research Gmbh et al: "Initial Random Access Procedure in Non-Terrestrial Networks (NTN)", 3GPP Draft; R2-1818510 Rach, 3rd Generation Partnership Project (3GPP), Mobile Competence Centre; 650, Route Des Lucioles ; F-06921 Sophia-Antipolis Cedex; France, vol. RAN WG2, No. Spokane, USA; Nov. 12, 2018-Nov. 16, 2018. Nov. 2, 2018 (Nov. 2, 2018), XP051482366.

Spreadtrum Communications: "Considerations on the channel structure on 2-step RACH", 3GPP Draft; RI-1904778 Considerations on the Channel Structure on 2-Step RACH V1.0, 3rd Generation Partnership Project (3GPP), Mobile Competence Centre; 650, Route Des Lucioles; F-06921 Sophia-Antip, vol. RAN WGI, No. Xi 'an, China; Apr. 8, 2019-Apr. 15, 2019, Apr. 7, 2019 (Apr. 7, 2019), XP051699953.

ZTE, "Summary of 7.2.1.1 Channel Structure for Two-step RACH", 3GPP Draft; R1-1907673 FL Summary for 2-step RACH Channel Structure, 3rd Generation Partnership Project (3GPP), Mobile Competence Centre ; 650, route des Lucioles ; F-06921 Sophia-Antipolis Cedex ; France, Mobile Competence Centre ; 650, route des Lucioles ; F-06921 Sophia-Antipolis Cedex ; France , (May 16, 2019), vol. RAN WG1, No. Reno, USA; May 13, 2019-May 17, 2019, XP051739962.

\* cited by examiner

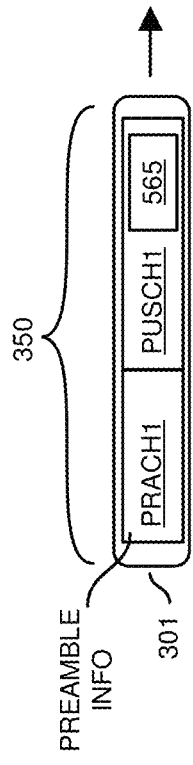

FIG. 6

THE PUSCH IN MSG 350 INCLUDES THE FOLLOWING INFO:
BASELINE PARAMETERS SUCH AS:
- CONNECTION REQUEST
- ...

- SUPP DATA 565 INDICATING REASON FOR SELECTING
A CH ACCESS PROCEDURE SUCH AS:

- HIGH CO
- CO-CHANNEL INTERFERENCE/HIDDEN NODE
- LARGE/INCREADSING CWS
- ONE OR MORE EXPIRY OF 4-STEP RACH CONTENTION
- SCHEDULING REQUEST (SR)
- BUFFER SIZE REPORT (BSR)

- BUFFER SIZE (IF DSR INDICATION IS VALID)

ENHANCED IMPLEMENTATION OF A RANDOM ACCESS CHANNEL

RELATED APPLICATION

This application is a divisional application of earlier filed U.S. patent application Ser. No. 16/541,855 entitled "ENHANCED IMPLEMENTATION OF A RANDOM ACCESS CHANNEL,", filed on Aug. 15, 2019, the entire teachings of which are incorporated herein by this reference.

BACKGROUND

In general, a so-called random access procedure (a.k.a., RACH) is used by respective user equipment (UE) in a wireless network environment to establish a wireless communication link for a respective data transfer.

There are multiple conventional random channel access procedures including a so-called 4-step random channel access procedure and a 2-step random channel access procedure.

In general, a baseline 4-step channel access procedure (RACH) in NR (New Radio) consists of exchanging four messages between respective user equipment and a gNB (gNodeB):

1) Msg1 is the preamble transmitted by the UE (User Equipment) to gNB. There are various preamble formats supported in the baseline. For example, the user equipment (UE) selects a PRACH (preamble) and sends it in a designated time and frequency location after reading RACH parameters from SIB2. Note that in FR2 operation, the UE first selects the best SSB from SS burst and then it sends corresponding PRACH (related to that SSB) to gNB. In this manner, the UE selects the beam and then it transmits the PRACH (preamble) on same beam.

2) After detection of the Msg1, the gNB sends Msg2 or random access response (RAR) to the UE; message 2 carries different information such as: timing advance (TA), temporary C-RNTI, and an UL grant for subsequent communications transmissions by UE. The UL grant includes: Freq. hopping flag, Msg3 PUSCH freq./time resource allocation, MCS, power control command for Msg3, and CSI request.

3) UE tries to decode RAR by detecting a PDCCH, with DCI format 1_0, with corresponding RA-RNTI during a RAR window. If a PDCCH with the RA-RNTI is detected, then the PDSCH is decoded. If the carried RAP-ID is same as expected for the transmitted PRACH, the UE then obtains the UL grant for transmission of Msg3 and sends Msg3 in the UL granted wireless resources to the gnodeB. If the carried RAP-ID is not as expected, the procedure starts again with transmission of a new PRACH.

4) After detecting Msg3, the gNB sends Msg4 to the UE, which concludes contention resolution.

The processing of each of above messages in the 4 step RACH operation requires multiple slots, which amounts to many slots in total. Given that RACH is initiated by MAC (Media Access Control) during several procedures, the total delay by conclusion of a RACH procedure adds to the overall delay.

Due to the overall delay, 3GPP has defined a conventional 2-step RACH procedure. The conventional 2-step random channel access procedure includes only message A and message B instead of message 1, message 2, message 3, and message 4.

Message A (a.k.a., MsgA) in the 2-step RACH procedure is the first message transmitted by the UE to the gNB, which consists of a preamble (PRACH) followed by a (PUSCH) channel that carries additional information. MsgB is the response message by the gNB that potentially concludes contention resolution. If gNB does not fully decode MsgA, it may send an RAR to the UE which leads the procedure to fall back to 4-step RACH In certain instances, user equipment may support 2-step RACH capability or the baseline 4-step RACH, or both. In a 2-step RACH, the content of Msg2 response from gNB depends on factors such as the level of MsgA decoding.

If gNB successfully decodes the preamble and the accompanying PUSCH in message A, then the gNB responds with MsgB including a successRAR.

However, in certain instances, if the gNB successfully decodes the preamble but not the accompanying PUSCH in message A, the gNB responds with MsgB fallbackRAR (which is equivalent to Msg2).

BRIEF DESCRIPTION OF EMBODIMENTS

Embodiments herein provide improved use of allocated wireless resources to support wireless communications in network environment.

For example, first embodiments herein include providing supplemental data in a message from a mobile communication device to a wireless base station.

First Embodiments

More specifically, embodiments herein include a system comprising a first mobile communication device operating in a wireless network environment. During operation, the first mobile communication device detects one or more conditions associated with the wireless network environment. Based on the one or more detected conditions, the first mobile communication device selects amongst multiple channel access procedures. In one embodiment, the first mobile communication device (user equipment) executing the selected first channel access procedure is operable to populate a message (such as a connect request message) of the first channel access procedure with supplemental data indicating the detected condition. For example, transmission of the respective message (such as message A) from the first mobile communication device to the wireless base station notifies the wireless base station of the one or more conditions prompting (causing) the first mobile communication device to select the first channel access procedure over the second channel access procedure.

In accordance with further embodiments, the selectable multiple channel access procedures include a first channel access procedure and a second channel access procedure. Assume that the first mobile communication device selects the first channel access procedure based on the detected one or more conditions. Via execution of the first channel access procedure, the initiates establishing a wireless communication link with a wireless base station. The established wireless communication link supports a data transfer from the mobile communication device to the wireless base station or from the wireless base station to the mobile communication device.

In yet further embodiments, each of the multiple channel access procedures implements use of a random-access wireless channel resource to communicate with the wireless base station; the random-access wireless channel (such as a RACH) is shared by multiple mobile communication devices to access the wireless base station. Any suitable technique (such as listen before talk or other suitable protocol) can be used to acquire rights to use of the shared random-access wireless channel.

In accordance with further embodiments, the first channel access procedure is a two-step RACH (Random Access CHannel) procedure; the second channel access procedure is a four-step RACH procedure. The execution of the first channel access procedure includes populating message A of the 2-step RACH procedure with different supplemental data depending on a detected condition. In one embodiment, the one or more specific conditions detected by the user equipment prompts the user equipment to select the 2-step RACH procedure over the 4-step RACH procedure.

In accordance with still further embodiments, the detected one or more conditions includes detected contention amongst multiple mobile communication devices including the first mobile communication device attempting to acquire use of a shared random-access channel. The contention can be detected in any suitable manner. In one embodiment, the contention is caused by one or more conditions such as i) high channel occupancy in the shared random-access wireless channel, ii) high co-channel interference/presence of hidden nodes, iii) large or increasing contention window size associated with LBT, iv) expiry of 4 step RACH procedure, etc.

In yet further embodiments, the first mobile communication device (user equipment) executing the selected first channel access procedure includes populating a message (such as a connection request message) of the first channel access procedure with supplemental data indicating the one or more conditions detected by the mobile communication device. In such an instance, transmission of the respective message (such as message A) from the first mobile communication device to the wireless base station notifies the wireless base station of the one or more conditions prompting the first mobile communication device to select the first channel access procedure over the second channel access procedure. In other words, the supplemental data communicated from the mobile communication device to the wireless base station can indicate a reason why the mobile communication device selected the first channel access procedure instead of the second channel access procedure.

In yet further embodiments, the first mobile communication device and/or wireless base station may experience an inability (a.k.a., conditions of ineffectiveness) to complete execution of the first channel access procedure. In such an instance, the user equipment/wireless base station fall back to executing the second channel access procedure in response to the inability.

Supplemental data communicated from the mobile communication device to the wireless base station can include any suitable information. In one embodiment, the detected condition (as specified by supplemental data from the user equipment of the base station) indicates high usage of a channel access as detected by the first mobile communication device prompts the user equipment to execute the first channel access procedure. The detected condition also can be detected presence of wireless interference in the shared random-access channel as detected by the first mobile communication device.

Further embodiments herein include execution of the first channel access procedure to establish the wireless communication link between the first mobile communication device and the wireless base station. In such an embodiment, the first mobile communication device (user equipment): populates a connection request message with a schedule request indication; communicates the connection request message (to transfer data) from the first mobile communication device over a shared random-access wireless channel; and receives a scheduled channel grant communication (from the wireless base station) in response to communicating the connection request message.

In accordance with further embodiments, execution of a selected channel access procedure includes: populating a connection request message with buffer information associated with a buffer of the first mobile communication device; and communicating the connection request message from the first mobile communication device over the acquired shared random-access wireless channel to the wireless base station. In one embodiment, the buffer information indicates an amount of data in the buffer to be wirelessly transmitted by the first mobile communication device to the wireless base station.

In accordance with still further embodiments, the channel access procedure selected by the first mobile communication device is a 4-step RACH channel access procedure; the second channel access procedure is a 2-step RACH channel access procedure. In one embodiment, the first mobile communication device is operative to select the first channel access procedure in response to a detected condition in which a wireless transmit power level of the first mobile communication device is limited.

Embodiments herein are useful over conventional techniques. For example, communication of the detected one or more conditions prompting the first mobile communication device to select a channel access procedure notifies the wireless base station of network conditions and/or attributes of the first mobile communication device requesting a respective data transfer.

Second Embodiments

Second embodiments herein include a wireless base station operative to: receive a first wireless message communicated from a mobile communication device. In response to the first wireless message, the wireless base station: i) acquires access rights to communicate over a shared wireless channel in a respective channel occupancy time associated with the shared channel; and ii) during the channel occupancy time, communicates a wireless response message from the wireless base station over the shared wireless channel to the mobile communication device, the wireless response message scheduling a second wireless message from the mobile communication device to the wireless base station within the respective channel occupancy time acquired by the wireless base station. Thus, both the wireless base station and the mobile communication device share use of the channel occupancy time acquired by the wireless base station.

In accordance with still further embodiments, the wireless base station communicates the wireless response message to the mobile communication device in response to an inability of the wireless base station to decode at least a portion of the received first wireless message from the mobile communication device.

Note that the wireless base station can be configured to perform any suitable function to acquire the shared wireless channel. For example, in one embodiment, the wireless base station implements a listen before talk protocol or other suitable protocol at the wireless base station to acquire the access rights to communicate over the shared wireless channel in the respective channel occupancy time.

In response to detecting an inability of the wireless base station to decode at least a portion of the received wireless message from the mobile communication device, the wireless base station can be configured to initiate a fallback from a first channel access procedure selected by the mobile communication device to a second channel access procedure.

The inability of the wireless base station to decode at least a portion of the received wireless message can occur for any of multiple reasons. For example, in one embodiment, the inability occurs in response to high channel occupancy of other wireless stations wirelessly communicating in the wireless network environment in which the mobile communication device and the wireless base station reside.

In still further embodiments, in addition to scheduling the second wireless message in the wireless response message from the wireless base station, the wireless base station can be configured to provide an additional uplink grant of wireless resources to the mobile communication device in case the mobile communication device misses the channel occupancy time (associated with the wireless base station acquiring the shared channel) to communicate the second wireless message. Because the mobile communication device uses the channel occupancy time associated with the wireless base station acquiring the shared channel, the mobile communication device no longer needs to perform a listen before talk protocol to acquire the shared wireless channel again.

Yet further embodiments herein include a wireless base station operative to receive a first wireless message communicated from a mobile communication device. In response to the first wireless message, the wireless base station: i) acquires access rights to communicate over a shared wireless channel in a respective channel occupancy time, and ii) in the acquired shared wireless channel, the wireless base station communicates a response message from the wireless base station to the mobile communication device, the response message including repeated transmission of a wireless communication.

In accordance with further embodiments, the response message from the wireless base station includes a first portion and second portion, the first portion of the response message indicates presence and/or where the wireless communication is repeated in the second portion.

In one embodiment, the wireless base station communicates the wireless communication multiple times in a so-called RAR (Random Access Response) repetition window, for instance in response to an inability of the wireless base station to decode at least a portion of the received first wireless message from the mobile communication device. Thus, repetition of a reply message from the wireless base station may depend on occurrence of a failure of the wireless base station receiving all or a portion of a wireless message communicated from the mobile communication device, or may depend on the base station decision to enhance the reception of the reply message at the user equipment side.

Note that the wireless base station can be configured to perform any suitable function to acquire the shared wireless channel. For example, in one embodiment, the wireless base station implements a listen before talk protocol at the wireless base station to acquire the access rights to communicate over the shared wireless channel in the respective channel occupancy time.

In response to detecting an inability of the wireless base station to decode at least a portion of the received wireless message, the wireless base station initiates a fallback from a first channel access procedure selected by the mobile communication device to a second channel access procedure selected by the wireless base station.

The inability of the wireless base station to decode at least a portion of the received wireless message can occur for any of multiple reasons. For example, in one embodiment, the inability occurs in response to high channel occupancy of other wireless stations wirelessly communicating in the wireless network environment in which the mobile communication device and the wireless base station reside.

In yet further embodiments, the wireless base station produces the wireless communication to include is a PDCCH (Physical Downlink Control Channel) message. Alternatively, the wireless base station produces the wireless communication to include a combination of a PDSCH (Physical Downlink Control Channel) message and a PDCCH (Physical Downlink Control Channel) message.

Further embodiments herein include a wireless base station operative to receive a first wireless message communicated from a mobile communication device. In response to the first wireless message, the wireless base station: i) acquires access rights to communicate over a shared wireless channel, and ii) in the acquired shared wireless channel, adjusts modulation coding of communicating a wireless response message from the wireless base station to the mobile communication device.

In one embodiment, the wireless base station adjusts modulation coding of the wireless response message in response to a failure of the wireless base station decoding the first wireless message.

In a similar manner as previously discussed, if desired, the wireless response message can be configured to include repeated transmission of a particular communication in a so-called RAR repetition window in a manner as previously discussed.

Note that any of the resources as discussed herein can include one or more computerized devices, mobile communication devices, sensors, servers, base stations, network nodes, wireless communication equipment, communication management systems, wireless stations, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable hardware storage medium and/or system having instructions stored thereon. The instructions, when executed by the computer processor hardware, cause the computer processor hardware (such as one or more co-located or disparately processor devices or hardware) to: detect a condition in a wireless network environment; based on the detected condition, select a first channel access procedure amongst multiple channel access procedures, the multiple channel access procedures including the first channel access procedure and a second channel access procedure; and via execution of the first channel access procedure, establishing a wireless communication link with a wireless base station.

Another embodiment herein includes a computer readable hardware storage medium and/or system having instructions stored thereon. The instructions, when executed by the computer processor hardware, cause the computer processor hardware (such as one or more co-located or disparately located processor devices or hardware) to: receive a first wireless message communicated from a mobile communication device; and in response to the first wireless message: i) acquiring access rights to communicate over shared wireless channel in a respective channel occupancy time; and ii) during the respective channel occupancy time, communicating a wireless response message from the wireless base station over the shared wireless channel to the mobile communication device, the wireless response message scheduling communication of a second wireless message from the mobile communication device to the wireless base station within the respective channel occupancy time.

Another embodiment herein includes a computer readable hardware storage medium and/or system having instructions stored thereon. The instructions, when executed by the computer processor hardware, cause the computer processor hardware (such as one or more co-located or disparately located processor devices or hardware) to: receive a first wireless message communicated from a mobile communication device; and in response to the first wireless message: i) acquire access rights to communicate over a shared wireless channel, and ii) in the acquired shared wireless channel, adjust modulation coding of communicating a wireless response message from the wireless base station to the mobile communication device.

Another embodiment herein includes a computer readable hardware storage medium and/or system having instructions stored thereon. The instructions, when executed by the computer processor hardware, cause the computer processor hardware (such as one or more co-located or disparately located processor devices or hardware) to: receive a first wireless message communicated from a mobile communication device; and in response to the first wireless message: i) acquire access rights to communicate over a shared wireless channel in a respective channel occupancy time, and ii) in the acquired shared wireless channel, communicate a response message from the wireless base station to the mobile communication device, the response message including repeated transmission of a wireless communication.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless communications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 6 is an example diagram illustrating supplemental data included in a multi-message channel access procedure according to embodiments herein.

Figure 1:
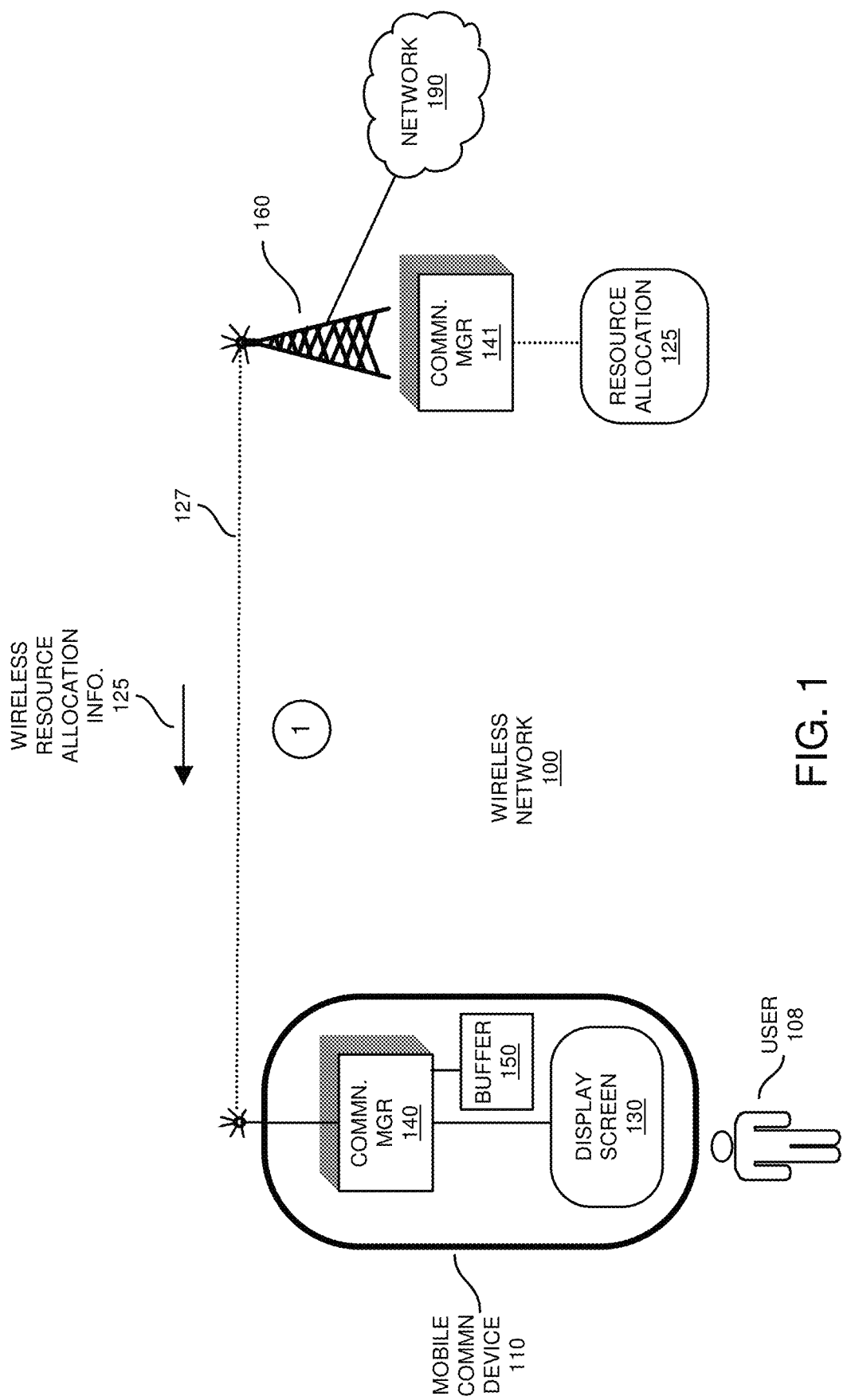
FIG. 1 is an example diagram illustrating allocation of resources in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

Now, with reference to the drawings, FIG. 1 is an example diagram illustrating allocation of resources in a wireless network environment according to embodiments herein.

As shown in this example embodiment, wireless network environment 100 includes mobile communication device 110 (a.k.a., user equipment) operated by user 108. The mobile communication device 110 (such as user equipment) includes communication manager 140 and corresponding one or more wireless interface (such as one or more antennas), supporting wireless communications with the wireless base station 160 or other wireless base stations in network environment 100. The mobile communication device 160 further includes a display screen 130 operative to display images for viewing by the respective user 108 based on received data over a wireless communication link from the wireless base station 160.

Wireless base station 160 (such as a gNodeB) includes communication manager 141 supporting communications with one or more mobile communication devices (different instances of user equipment) in the network environment 100.

Note that the wireless stations (wireless base station 160, mobile communication device 110, etc.) in wireless network can be configured to operate in any suitable carrier frequency or wireless communication protocol.

In one embodiment, the wireless base station 160 and the mobile communication device 110 both support wireless communications in an unlicensed radio band such as 5G NR-U, although the wireless stations as discussed herein can be implemented to support any suitable wireless protocol in any suitable wireless spectrum.

As further shown, in one embodiment, the mobile communication device 110 receives notification of an allocation of wireless channel resources (such as frequency and time domain information) via wireless resource allocation information 125 broadcasted from the wireless base station 160 or other suitable resource over a wireless medium.

In one example embodiment, the wireless resource allocation information 125 includes information facilitating communications from the mobile communication device 110 to the wireless base station 160 over a shared random access channel over which the mobile communication device 110 and other mobile communication devices in the network environment 100 potentially compete for use to communicate with the wireless base station 160 or other wireless base stations in network environment 100. In one embodiment, the mobile communication device 110 uses the allocated resources as specified by the wireless resource allocation information 125 to request establishment of a wireless communication link over which to communicate data to the wireless base station.

In yet further embodiments, the wireless resource allocation information 125 indicates one or more so-called preambles (such as 64 preambles or other suitable number of preambles) that are selectable by the mobile communication device 110 to communicate over the shared random access channel.

Note that the wireless resource allocation information 125 can be configured to further include information such as frequency domain resources, time domain resources, etc., that are allocated for use by the mobile communication device 110 (or other mobile communication devices in the network environment 100) to communicate over a respective shared random access channel to the wireless base station 160.

In one embodiment, the wireless resource allocation information 125 indicates or specifies one or more so-called resource blocks (partitioned in both the time domain and frequency domain) available for use by the mobile communication device 110 to communicate information to the wireless base station 160.

As indicated by the wireless resource allocation information 125, the allocated set of wireless channel resources includes further information such as identities of a set of wireless carrier frequencies (such as so-called resource blocks as previously discussed). By further way of non-limiting example embodiment, the wireless carrier frequencies in the allocated set are non-contiguous (a.k.a., interlaced in which there is a gap between one allocated carrier frequency and the next allocated carrier frequency) with respect to each other in which to transmit the first communication and the second communication.

Alternatively, the wireless carrier frequencies in the allocated set are contiguous (a.k.a., no gap between one allocated carrier frequency and the next allocated carrier frequency) with respect to each other in which to transmit the first communication and the second communication.

Thus, allocated resources as specified by the wireless resource allocation information 125 can include any suitable information. In one embodiment, as further discussed below in FIG. 2 and FIG. 3, the wireless resource allocation information 125 indicates one or more sets of resource blocks (contiguous or spaced apart) to communicate over the shared random access channel.

Referring again to FIG. 1, note that the shared random access channel can be used for any suitable purpose such as to request establishing of a wireless communication link for a data transfer between a mobile communication device and a wireless base station in the network environment 100. One reason for the mobile communication device 110 to request a wireless communication link is because the mobile communication device 110 has data in buffer 150 that needs to be transmitted to a destination in the remote network 190.

Subsequent to establishing a respective wireless communication link between the mobile communication device 110 and the wireless base station 160, the mobile communication device 110 is able to communicate through the wireless base station 160 to the remote network. Conversely, subsequent to establishing a respective wireless communication link between the mobile communication device 110 and the wireless base station 160, one or more server resources in the remote network 190 are able to communicate through the wireless base station 160 to the mobile communication device 110.

Figure 2:
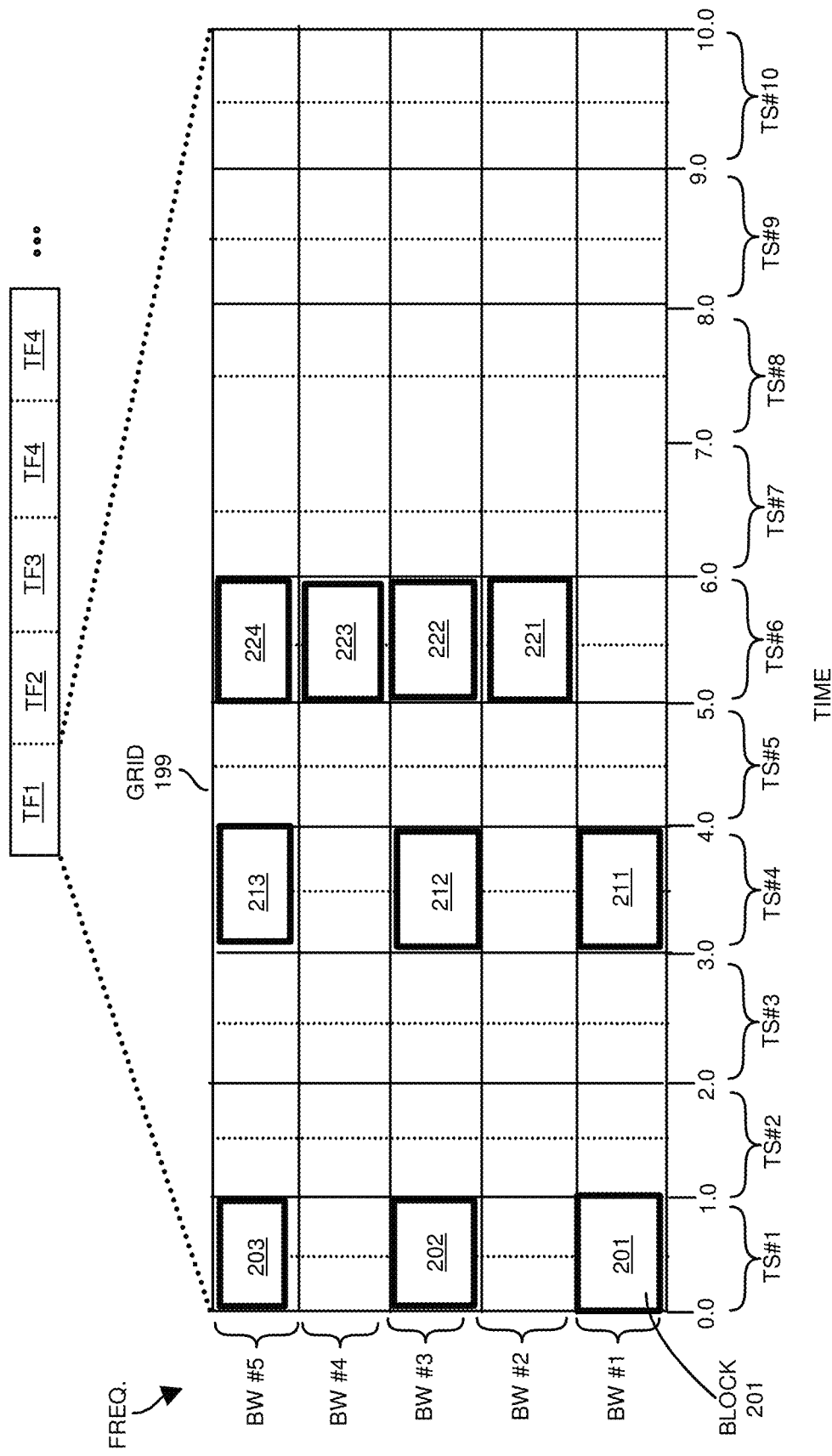
FIG. 2 is an example diagram illustrating frequency-time domain resources according to embodiments herein.

FIG. 2 is an example diagram illustrating a grid including multiple blocks from which schedule information is generated according to embodiments herein.

In one embodiment, resources associated with resource allocation 125 are allocated in multiple timeframes. In one nonlimiting example embodiment, each full frame (such as multiple timeframes TF1 to TF10) is 10 mS (milliseconds) in duration.

Each timeframe (such as TF1, TF2, etc.) includes 100 resource blocks or 50 resource block pairs, supporting 20 MHz of bandwidth. In one embodiment, each resource block is transmitted over a 0.5 mS of a respective time slot. Two resource blocks represent a single block 201 (such as a resource block pair) during a 1 mS subframe (such as timeslot TS #1, timeslot TS #2, timeslot TS #3, etc.).

As further discussed in FIG. 3 below, by way of nonlimiting example embodiment, each resource block is made up of twelve carrier frequencies, each supporting a bandwidth of 15 KHz, each carrying 7 OFDM symbols over a respective duration of 0.5 mS. This means each resource block is 15×12=180 KHz wide in frequency and is composed of 12×7=84 resource elements.

In one embodiment, each resource element supports transmission of a single symbol. Thus, 84 resource elements associated with a given resource block enables transmission of 84 symbols.

In one embodiment, one or more resource blocks such as resource block 201, resource block 202, resource block 203, resource block 211, resource block 212, resource block 213, resource block 221, etc., are allocated to support conveyance of data from the mobile communication device 110 to the wireless base station 160.

Figure 3:
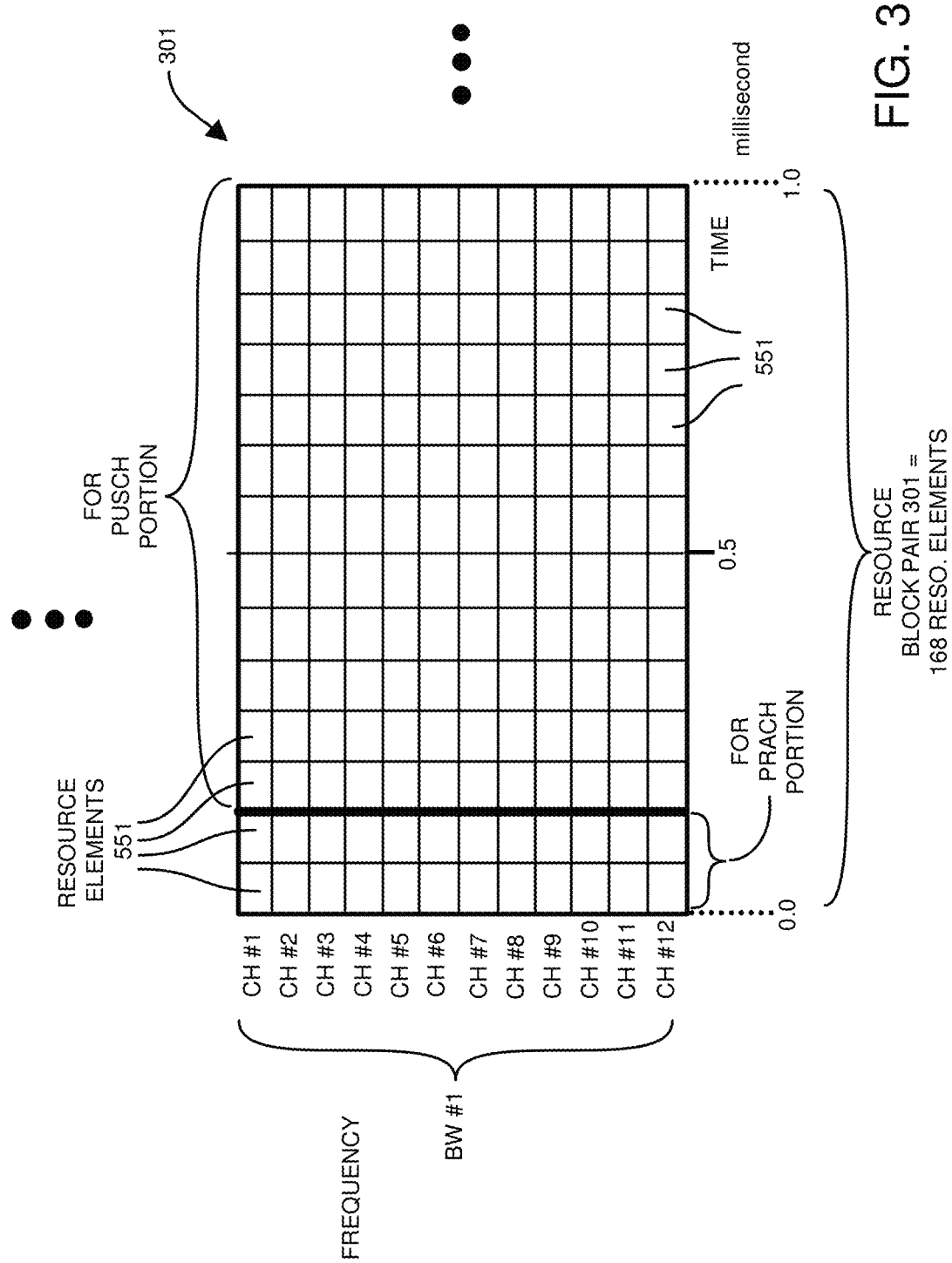
FIG. 3 is an example diagram illustrating details of resource blocks in which to convey wireless data according to embodiments herein.

FIG. 3 is an example diagram illustrating one of multiple allocated resource blocks according to embodiments herein.

In one embodiment, each resource block pair 301, includes 168 resource elements 551 as shown in FIG. 3.

For example, resource block pair 301 in FIG. 3 includes a grid subdivided in the time domain and frequency domain to produce multiple resource elements 551.

A first portion (between time 0.0 and 0.5. mS) of resource block pair 301 (a first resource block) includes 84 resource elements 551; a second portion (between time 0.5 and 1.0 mS) of resource block pair 301 (second resource block) includes 84 resource elements 551. This totals 168 resource elements for the resource block pair 301.

Note that the duration and number of resource elements in the resource block 301 can vary depending on the embodiment. Additionally, the number of carrier frequencies (such as channels #1-12) assigned to a resource block can vary depending on the embodiment.

As previously discussed, each resource element enables transmission of data. For example, in one embodiment, each resource element conveys one symbol in a respective sub-channel such as channel #1, channel #2, channel #3, channel #4, etc. Thus, resource block pair 301 in this example embodiment (such as resource block of 1 mS duration and 12 channels) supports conveyance of 168 symbols (14 resource elements per channel times 12 channels) between the mobile communication device 110 and the wireless base station 160.

As described herein, each resource block pair can be partitioned and used in any manner such as to send PRACH, PUSCH, and supplemental message information. For example, depending on the embodiment, all resource elements in a respective resource block can be used to communicate preamble information; all resource elements in a respective resource block can be used to communicate connection request information; different portions of each resource block can be used to support conveyance of different information such as preamble information, connection request information, supplemental data, etc.

In one nonlimiting example embodiment, the first two columns of the resource elements 551 in the resource block pair 301 are allocated to carry preamble information (PRACH); the last twelve columns of the resource elements 551 in the resource block pair 301 are allocated to carry PUSCH information. If desired, one or more columns of the resource block pair 301 can be configured to support conveyance of supplemental as described herein.

Figure 4:
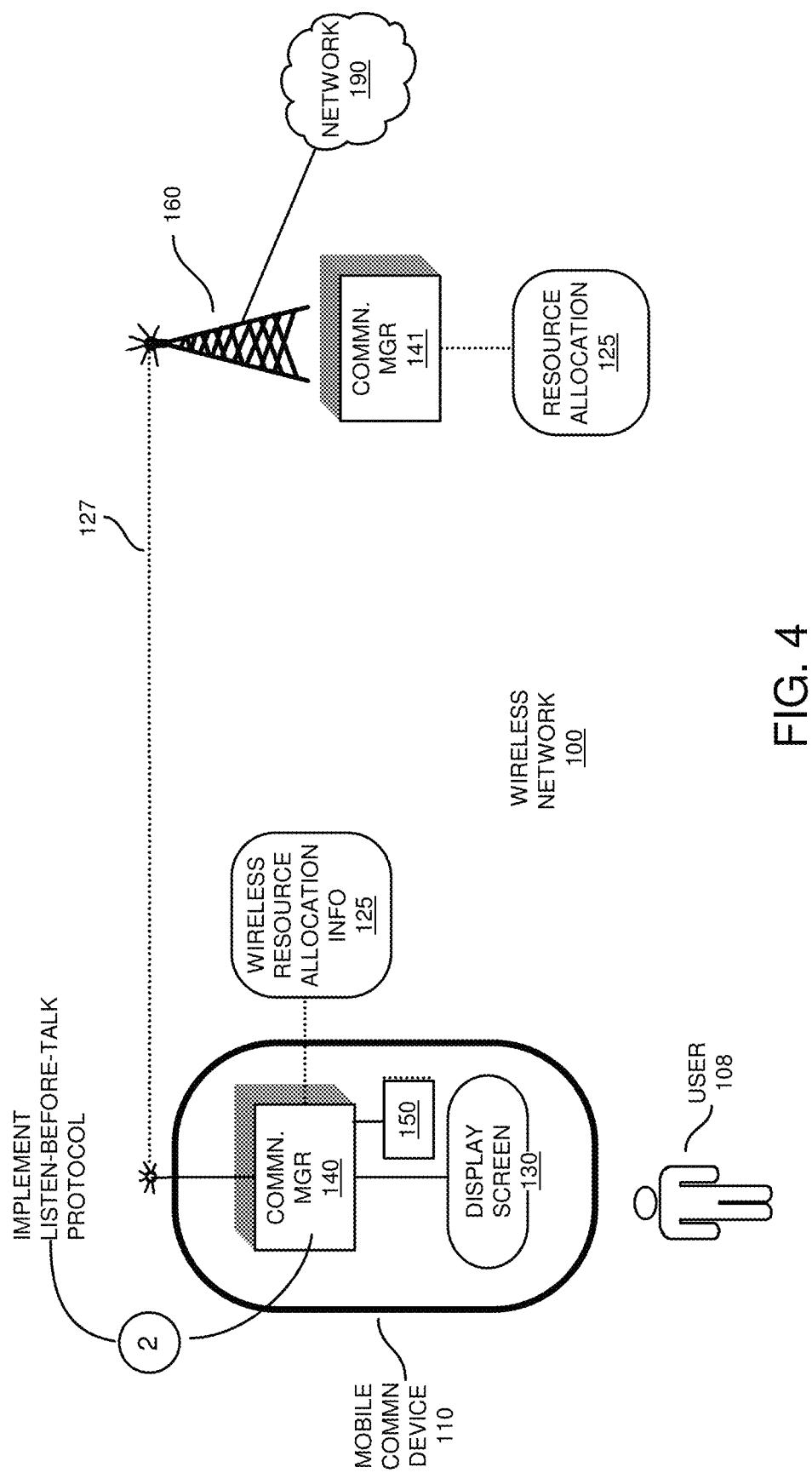
FIG. 4 is an example diagram illustrating implementation of a listen before talk channel access protocol to acquire a wireless channel according to embodiments herein.

FIG. 4 is an example diagram illustrating implementation of a listen before talk protocol to acquire a wireless channel according to embodiments herein.

Assume in this example embodiment that the communication manager 140 associated with the mobile communication device 110 receives input (such as triggered based on detection of data in the buffer 150 above a threshold value or other suitable event) indicating to establish a wireless communication link with the wireless base station 160. In such an instance, in response to the detected event or decision to initiate establishing a wireless communication link as shown in FIG. 4, the mobile communication device 110 implements a listen before talk protocol prior to communicating over the shared random access channel to the wireless base station 160.

Figure 5:
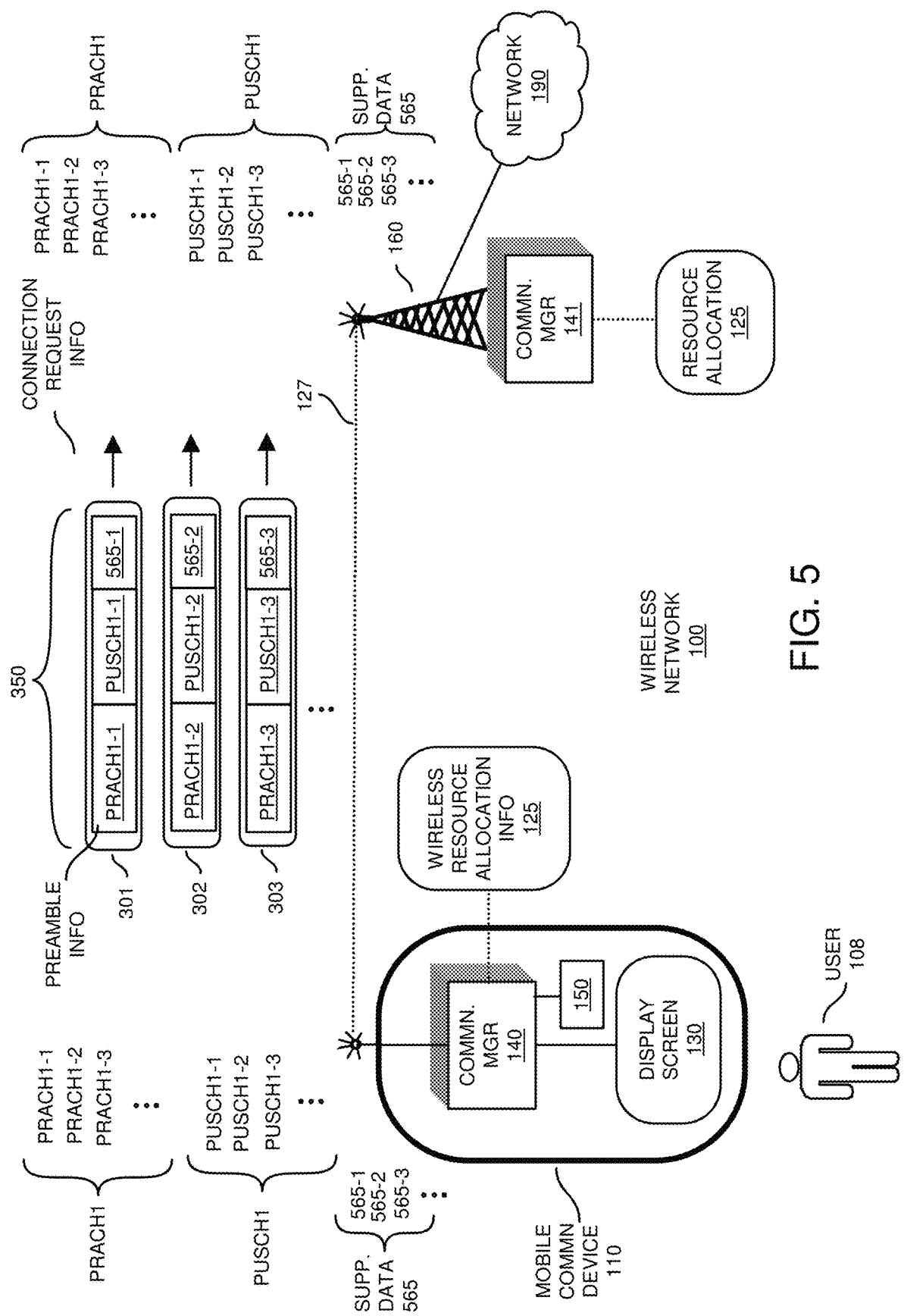
FIG. 5 is an example diagram illustrating communication of messages and corresponding supplemental data over an acquired channel according to embodiments herein.

In response to acquiring use of the shared random access channel, and a respective channel occupancy time to wirelessly communicate data, the mobile communication device 110 generates further communications as shown in FIG. 5.

FIG. 5 is an example diagram illustrating communication of messages over an acquired channel according to embodiments herein.

In one embodiment, in order to establish a wireless communication link between the mobile communication device 110 and the wireless access point 160, the mobile communication device 110 (user equipment) initiates a 2-step RACH (channel access procedure such as one in which the mobile communication device 110 communicates a message A to the wireless base station 160 and the wireless base station 160 (depending on circumstances) responds by sending a message B or message #2 to the mobile communication device 110) if one or more of the following conditions are met:

1) Channel occupancy (CO) in the operating (such as unlicensed) shared channel is above a certain threshold. LAA (License Assisted Access) defines it as percentage of times that received RSSI is larger than a threshold. Other indications of higher channel occupancy are: 1) multiple pauses until expiry of the wait time drawn from a CWS (Contention Window Size), etc.

Occurrence of higher CO causes the contention window size (CWS) for channel access to be longer, causing further delay in channel access. Hence performing a 2-step RACH (instead of 4-step RACH) may help the to conclude the RACH procedure without excessive delay.

In one embodiment, in MsgA communicated from the mobile communication device 110 to the wireless base station 160, the mobile communication device 110 (UE) includes supplemental data indicating to wireless base station 160 (gNB). The supplemental data 565 indicates the reason for initiation of the 2-step RACH (instead of 4-step RACH) as being caused by a "high channel occupancy. Such a notification of this condition helps the wireless base station 160 (gNB) to possibly take further actions such as configuring RACH resources in additional sub-channels.

2.) L1-RSRP (Reference Signal Received Power) or attributes/RSSI (Received Signal Strength Indicator) of co-channel devices (e.g. inter-Public Land Mobile Network non-serving cells or co-channel non-NRU nodes) in the unlicensed channel meets specific criteria In one approach, different than above CO-based, this method considers when RSSI>RSSIth. A large RSSI (signal strength level) of the non-serving cells implies a higher ongoing/upcoming co-channel interference, increasing the chance of Msg2/Msg4 decoding failure at the UE (mobile communication device 110). Switching to 2-step RACH enhances the overall RACH procedure success by reducing the number of occasions where co-channel interference can impact reception at the mobile communication device (UE) side.

In one embodiment, the MsgA from the mobile communication device 110 indicates to the wireless base station 160 (gNB) of "large RSSI of non-serving cells or co-channel interferers" as the reason for initiation of 2-step RACH instead of the 4-steap RACH (and may report an average of measured co-channel interference). This helps wireless base station 160 (gNB) to adjust attributes of MsgB accordingly (with lower MCS, more redundancy, and/or duplicated MsgB transmissions).

In another approach, other attributes of the co-channel devices may be used. For example, if the mobile communication device 110 is capable of processing the preamble/MAC header of WiFi frames, the mobile communication device 110 may use the duration of the frame or the duration of the ongoing COT (TXOP) to initiate (e.g. if end of TXOP expected) or postpone (e.g. if TXOP just started) a 2-stage RACH.

3.) The CWS (Contention Window Size) of the related CAPC for PRACH has been increased several times due to previous (PRACH, SR and/or other UL) transmission failures. With increasing CWS, it may be beneficial that the mobile communication device 110 compensates for the added delay of the large CWS by switching to the 2-step RACH instead of the 4-step RACH.

Also related, if the average CWS of the related CAPC for RACH has increased beyond a threshold level, similar justification for switching to 2-step RACH applies. For example, increasing average CWS of other CAPC may also indicate higher likelihood in channel access delay for PRACH transmission.

High CO or large CWS indication in MsgA could be used to help gNB to take appropriate steps.

4.) If decoding of Msg2 (or Msg4) of an ongoing 4-step RACH fails (possibly due to excessive co-channel interference), it may be beneficial for the mobile communication device 110 to switch to 2-step RACH.

In the subsequent MsgA transmission, the mobile communication device 110 indicates/quantifies to the gNB the presence of excessive co-channel interference experienced by the mobile communication device 110, which may be not be experienced by the wireless base station. In other words, presence of a co-channel node may be hidden to the wireless base station 160.

Msg2 decoding failure: a) PDSCH decoding failure when the PDCCH indicates the expected RA-RNTI, or 2) failure of decoding a PDCCH with DCI format 1_0 during the RA window (suitable when a short RA window is configured)

5.) If the 4-step RACH contention timer associated with the mobile communication device 110 expires one or more times, this indicates high contention in accessing the 4-step RACH resources. In such an instance, the mobile communication device 110 can be configured to switch to implementing 2-step RACH instead of the 4-step RACH procedure.

In one embodiment, the mobile communication device 110 includes a notification in MsgA indicating the reason for the mobile communication device 110 selecting the 2-step RACH as expiry of the contention timer. This provides feedback to the wireless base station 160 to possibly configure more RACH resources to reduce contention.

6.) In yet further embodiments, the UE (operating in a licensed or unlicensed band) is triggered to initiate a 2-step RACH if one or more of the following conditions are met:

When a mobile communication device 110 does not have a configured PUCCH for scheduling request (SR), instead of initiating a 4-step RACH procedure as in the baseline NR procedure, the UE may transmit MsgA with a "SR indication". The wireless base station 160 may not transmit a MsgB in response and instead sends a PDCCH with a scheduled grant to the mobile communication device 110. Alternatively, the MsgB communicated from the wireless base station 160 to the mobile communication device 110 includes a scheduled grant of wireless resources to the mobile communication device 110.

When a mobile communication device 110 does not have a configuration to send buffer status report (BSR), the mobile communication device 110 may transmit a MsgA with a BSR indication (as supplemental data) and the amount of the pending buffer size (i.e., amount of data in the buffer). In such an instance, the wireless base station 160 may not transmit a MsgB in response and instead sends a PDCCH with a scheduled grant to the mobile communication device 110. Alternatively, the MsgB communicated from the wireless base station 160 to the mobile communication device 110 includes a scheduled grant of resources to the mobile communication device 110.

7.) UE is triggered to decide against initiating a 2-step RACH (perform a 4-step RACH) if one or more of the following conditions are met:

The mobile communication device 110 is power-limited or constrained (either due to design or operating conditions of the UE).

The mobile communication device 110 has received indications from gNB to limit its transmit power emission due to the regulatory restrictions of the channel.

The mobile communication device 110 has received indications from gNB to limit its transmit power emission (for a configured duration) due to transitory events detected by the wireless base station 160. The transitory event could be presence of an incumbent technology in the unlicensed channel or the sub-channels where part or all of the RACH resources are configured Accordingly, with further reference to the FIG. 5, as previously discussed, the mobile communication device 110 receives wireless resource allocation information 125 from the wireless base station 160 or other suitable resource. In furtherance of establishing a respective wireless communication link with the wireless base station 160, the mobile communication device 110 implements a channel access procedure (such as a novel 2-step random channel access procedure) to establish a respective wireless communication link with the wireless base station 160.

For example, as shown in FIG. 5, the mobile communication device 110 communicates a wireless connection request message 350 to the wireless base station 160 using the allocation of the wireless channel resources as indicated by the wireless resource allocation information 125.

In accordance with further embodiments, the wireless connection request message 350 includes information such as: i) a first wireless communication including a preamble message such as a PRACH1 message, and ii) a second wireless communication such as a PUSCH1 message including connection request information for establishing a wireless communication link. The message 350 further includes supplemental data 565 indicating any of the above conditions #1 to #7.

As previously discussed, to communicate a request to establish a wireless channel, the communication manager 140 of the mobile communication device 110 selects one of multiple preambles (such as preamble PRACH1 in this example embodiment) associated with the wireless base station 160.

To facilitate transmission of the selected preamble PRACH1, the communication manager 140 partitions (subdivides) the bits in the preamble PRACH1 into multiple bit components including a first preamble portion (PRACH1-1), second preamble portion (PRACH1-2), third preamble portion (PRACH1-3), and so on.

As further shown below, subdividing the preamble information PRACH1 enables the preamble information to be communicated to the wireless base station 160 over multiple different frequency domain resources such as different spaced apart sets of wireless communication channels (or bandwidths) as specified by the wireless resource allocation information 125.

In addition to communicating preamble information (PRACH1) from the mobile communication device 110 to the wireless base station 160, the communication manager 140 associated with the mobile communication device 110 also communicates connection request information PUSCH1 (such as multiple bits of information) over the shared random access channel to the wireless base station 160.

In one embodiment, to facilitate transmission of the selected connection request information PUSCH1 to the wireless base station 160, the communication manager 140 partitions (subdivides) the bits in the connection request information PUSCH1 into multiple components including a first connection request information portion (PUSCH1-1), second connection request information portion (PUSCH1-2), third connection request information portion (PUSCH1-3), and so on.

As further shown below, subdividing the connection request information (PUSCH1 message of the wireless connection request message 350) enables the connection request information from the mobile communication device 110 to be communicated to the wireless base station 160 over multiple different frequency domain resources (such as one or more resource blocks) such as wireless communication channels as specified by the wireless resource allocation information 125.

As further shown, communication of the portions of preamble information PRACH1 and the connection request information PUSCH1 from the mobile communication device 110 to the wireless base station 160 includes combining portions of the preamble information and the connection request information into a wireless connection request message and transmitting the wireless connection request message 350 from the mobile communication device 110 to the wireless base station 160 over the acquired shared random access channel (acquired via implementation of a listen before talk protocol as previously discussed in FIG. 4).

More specifically, after acquisition of channel resources via implementing a listen before talk protocol, a first preamble portion PRACH1-1 and first connection request information portion PUSCH1-1 are communicated in a respective resource block 301 (first specific band of carrier frequencies in a first specified timeslot) from the mobile communication device 110 to the wireless base station 160; a second preamble portion PRACH1-2 and second connection request information portion PUSCH1-2 are communicated in a respective resource block 302 (second specific band of carrier frequencies and the first specified timeslot) from the mobile communication device 110 to the wireless base station 160; a third preamble portion PRACH1-3 and third connection request information portion PUSCH1-3 are communicated in a respective resource block 303 (third specific band of carrier frequencies and the first specified timeslot) from the mobile communication device 110 to the wireless base station 160; and so on.

Further embodiments herein include partitioning the supplemental data 565 (such as multiple bits of data) into sub-portions 565-1, 565-2, 565-3, etc., and then communicating such information over multiple different wireless channels.

In one example embodiment, a combination of the first wireless preamble communication and the second wireless connection request communication represent a message A of a 2-step RACH (Random Access Channel) procedure. In other words, in one embodiment, the wireless request message 350 represents message A in a respective 2-step channel access procedure.

Thus, in accordance with further embodiments, in addition to communicating PRACH1 and PUSCH1 information, the mobile communication device 110 communicates supplemental data 565 in the wireless connection request message 350 to the communication manager 141 of the wireless base station 160.

In one embodiment, the supplemental data 565 indicates one or more reasons that the mobile communication device 110 selected a 2-step channel access procedure instead of a 4-step channel access procedure. The supplemental indicate any of the one or more following conditions: i) detected high CO (Channel Occupancy) by the mobile communication device 110, ii) detected High co-channel interference/hidden node by the mobile communication device 110, iii) Large/increasing CWS (Contention Window Size) associated with the mobile communication device 110 acquiring a wireless channel resource, iv) (Multiple) expiry of 4-step RACH contention, iv) limitation of wireless power transmit levels applied or that must be adhered to by the mobile communication device 110.

In accordance with further embodiments, the supplemental data 565 can include information such as: v) a scheduling request (SR), vi) Buffer Size Report (BSR) and/or Buffer size information (if BSR indication is valid), Accordingly, one embodiment herein includes a system comprising a first mobile communication device 110 operating in a wireless network environment 100. During operation, the first mobile communication device 110 detects one or more conditions associated with the mobile communication device 110 and/or wireless network environment 100. Based on the one or more detected conditions, the first mobile communication device 110 selects amongst multiple channel access procedures to request establishment of a wireless communication link. In one embodiment, the selectable multiple channel access procedures include a first channel access procedure and a second channel access procedure.

Assume in this example embodiment that the first mobile communication device 110 selects the first channel access procedure (such as 2 step channel access procedure) based on the detected one or more conditions. Via execution of the first channel access procedure, the mobile communication device 110 initiates establishing a wireless communication link with the wireless base station 160.

In accordance with further embodiments, the first channel access procedure is a two-step (2 message) RACH (Random Access CHannel) procedure; the second channel access procedure is a four-step (4 message) RACH procedure.

The execution of the first channel access procedure includes populating wireless connection request message 350) of the 2-step RACH procedure with different supplemental data 565 depending on a detected one or more conditions. In one embodiment, the detected one or more conditions prompt the user equipment to select the 2-step RACH procedure over the 4-step RACH procedure.

In accordance with still further embodiments, as previously discussed, the detected one or more conditions includes detected contention amongst multiple mobile communication devices (including the first mobile communication device 110) in the network environment 100 attempting to acquire use of a shared random-access channel. The contention can be detected in any suitable manner. In one embodiment, the contention is caused by one or more conditions such as high channel occupancy in the shared random-access wireless channel, high co-channel interference/presence of hidden nodes, large or increasing contention window size associated with LBT, expiry of 4 step RACH procedure, etc.

In yet further embodiments, the first mobile communication device 110 (user equipment) executing the selected first channel access procedure includes populating the wireless connection request message 350 (such as a connect request message) of the first channel access procedure with supplemental data 565 indicating the detected condition. In such an instance, transmission of the respective message 350 from the first mobile communication device 110 to the wireless base station 160 notifies the wireless base station 160 of the one or more conditions prompting the first mobile communication device 110 to select the first channel access procedure over the second channel access procedure.

In yet further embodiments, the first mobile communication device 110 and/or wireless base station 160 may experience an inability to complete execution of the first channel access procedure. In such an instance, the user equipment/ wireless base station fall back to executing the second channel access procedure in response to the inability.

In accordance with still further embodiments, the detected condition indicates high usage of a random-access channel as detected by the first mobile communication device 110. The detected condition prompts the mobile communication device 110 to execute the first channel access procedure instead of the second channel access procedure. The detected condition causes the mobile communication device 110 to select the first channel access procedure also can be presence of wireless interference in the shared random-access channel as detected by the first mobile communication device 110.

In yet further embodiments, the first mobile communication device 110 (user equipment): populates a wireless connection request message 350 with a schedule request indication. The mobile communication device 110 communicates the connection request message 350 from the first mobile communication device 110 over a shared random-access wireless channel to the wireless base station 160. In response to receiving the wireless connection request message 350, the wireless base station 160 communicates a scheduled channel grant communication to the mobile communication device 110 in response to receiving the wireless connection request message 350.

In accordance with further embodiments, the mobile communication device 110 detects that the buffer 150 includes data (such as above a threshold value) to be transmitted to the wireless base station 160. In such an instance, the mobile communication device 110 populates the supplemental data 565 of the connection request message 350 with buffer information (such as a value indicating an amount of data to be transmitted) associated with the buffer 150 of the first mobile communication device 110. The mobile communication device 110 then communicates the wireless connection request message 350 from the first mobile communication device 110 over the acquired shared random-access wireless channel. In one embodiment, as mentioned, the buffer information indicates an amount of data in the buffer to be wirelessly transmitted by the first mobile communication device to the wireless base station.

In accordance with still further embodiments, the first mobile communication device is operative to select the first channel access procedure in response to a detected condition in which a wireless transmit level of the first mobile communication device 110 is limited.

FIG. 6 is an example diagram illustrating supplemental data included in a multi-step channel access procedure according to embodiments herein.

As previously discussed, the wireless connection request message 350 includes supplemental data 565 including information such as a reason that the mobile communication device 110 selected a particular channel access procedure.

As previously discussed, the supplemental data 565 can include further information facilitating establishment of a wireless connection such as a scheduling request (SR), buffer size report (BSR), buffer size, etc.

Figure 7:
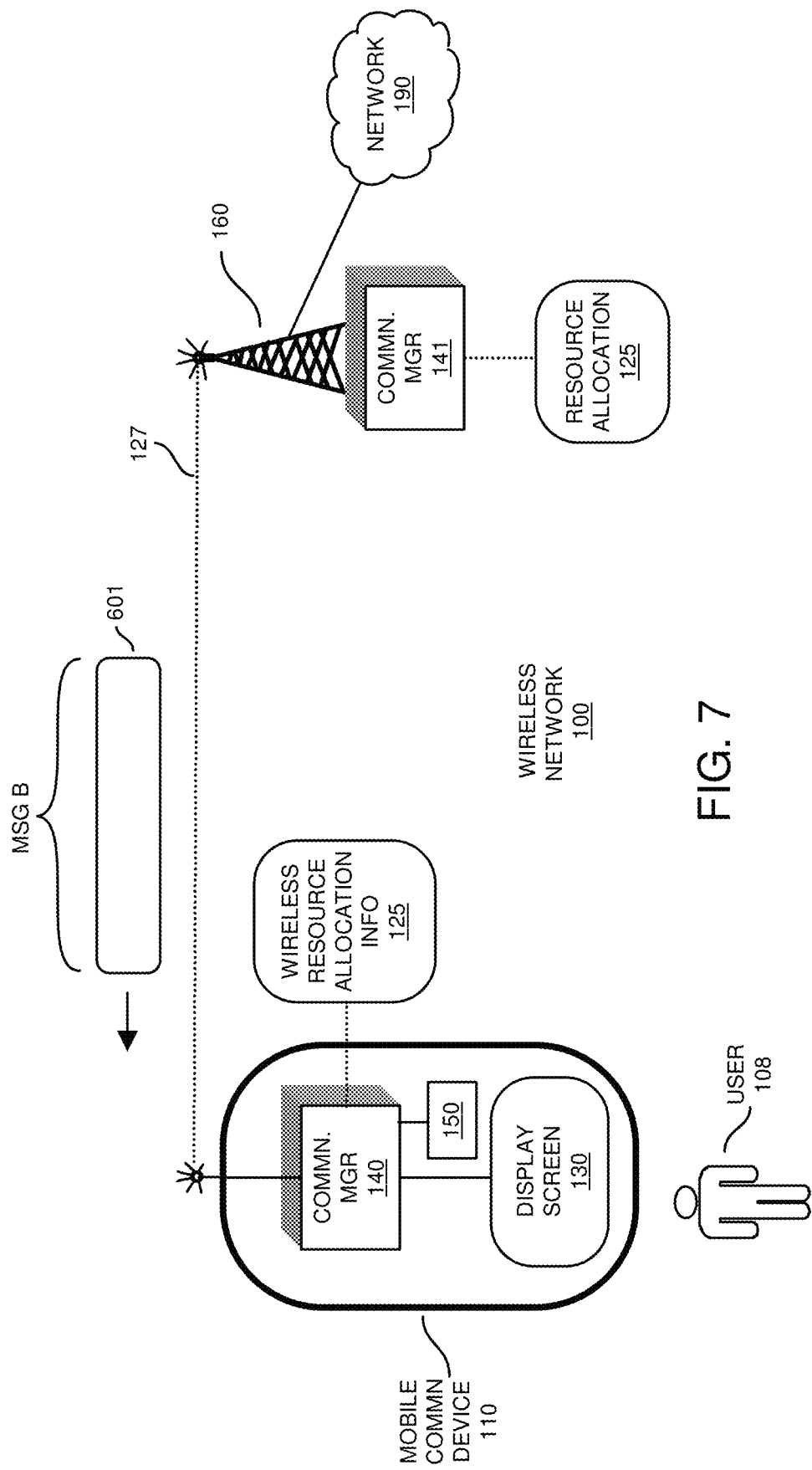
FIG. 7 is an example diagram illustrating a response message from a wireless base station according to embodiments herein.

As shown in FIG. 6, the PUSCH in message 350 from the mobile communication device 110 to the wireless base station 160 can be configured to include the following information:

(baseline) parameters such as:
 i) Connection request information (such as identity of the user equipment, etc.)
 ii) supplemental data 565 such as data indicating one or more reason that the mobile communication device 110 selected 2-step RACH instead of the 4-step RACH (a value from the following as discussed above):
  (#1) High CO (Channel Occupancy)
  (#2) High co-channel interference/hidden node
  (#3) Large/increasing CWS (Contention Window Size)
  (#4) (Multiple) expiry of 4-step RACH contention
  (#5) Scheduling request (SR)
  (#6) Buffer Size Report (BSR)
  (#6) Buffer size (if BSR indication is valid)
  (#7) limited power transmit levels FIG. 7 is an example diagram illustrating a response message from a wireless base station according to embodiments herein.

In response to receiving the wireless request message information 350 (such as message A associated with a 2-step channel access procedure) transmitted from the mobile communication device 110 to the wireless base station 160 in a manner as previously discussed, the communication manager 141 communicates message B (reply message allocating resources to the mobile communication device 110) via one or more resource blocks to the mobile communication device 110.

In one embodiment, the message B from the wireless base station 160 includes scheduling information and/or other suitable information facilitating establishment of a wireless communication link between the mobile communication device 110 and the wireless base station 160.

Figure 8:
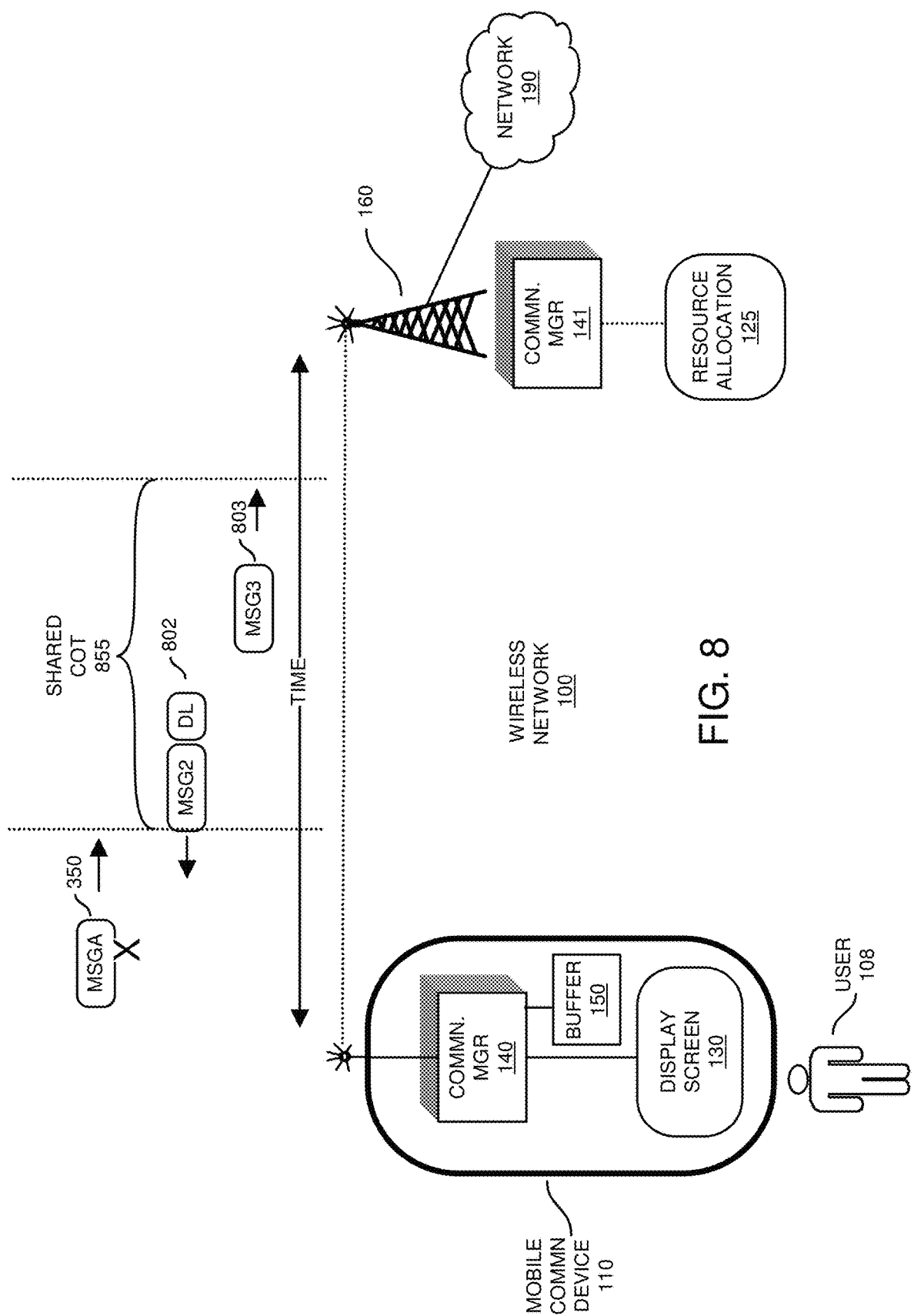
FIG. 8 is an example diagram illustrating use of a channel occupancy time to convey wireless communications in multiple directions according to embodiments herein.

FIG. 8 is an example diagram illustrating shared use of a channel occupancy time to convey communications in multiple directions according to embodiments herein.

Note further that, in NR-U operation, the failure associated with reception of wireless connection request message 350 (such as msgA) by the wireless base station 160 may occur due to reasons additional to that of licensed operation. For example, a decoding failure of a PUSCH message portion (such as a portion of the wireless connection request message 350) may be likelier than a failure of decoding a preamble message in the wireless connection request message 350 due to resiliency that preamble has to interference.

In one embodiment, during fallback from a first channel access procedure (2-step) to a second channel access procedure (4-step), the wireless base station 160 may schedule a Msg3 transmission by the mobile communication device 110 in the same channel occupancy time 855 acquired by the wireless base station 160 to transmit communications. In other words, in response to receiving message 350, the wireless base station 160 responds with a reply message 802. Because of the detected failure of receiving wireless connection request message 350, the wireless base station 160 responds with a message 2 (associated with a different channel access procedure initially selected by the mobile communication device 110).

To transit the wireless reply 802 (such as including msg2 instead of msgB), the wireless base station 160 executes a listen before talk protocol in which the wireless base station 160 acquires channel occupancy time 855 (during which the wireless base station 160 has rights in using the shared channel).

Thus, in such an instance, when the wireless base station 160 detects or experiences a failure of receiving message 350 from the mobile communication device 110, the fallbackRAR initiated by the wireless base station 160 may include the UL (Uplink) LBT category that the mobile communication device 110 uses to transmit Msg3 (e.g., LBT Cat-2 for a short gap between the end of gNB's downlink transmission and Msg3). This may also be due to high channel occupancy (a measured by the wireless base station 160 or as reported by one or more mobile communication device 110 in the wireless network environment 100).

As further shown, in response to receiving message 802, the mobile communication device 110 transmits message 803 (such as message 3) within the channel occupancy time 855 acquired by the wireless base station 160. Shared use of the channel occupancy time 855 acquired by the wireless base station 160 alleviates the mobile communication device 110 from having to acquire its own channel occupancy time to communicate message 803 to the wireless base station 160.

In accordance with further embodiments, the wireless base station 160 (gNB) may provide an additional UL (Uplink) grant for Msg3 (after the gNB-owned/acquired channel occupancy time 855), in case the mobile communication device 110 cannot process information received, Msg2 and prepare Msg3 on time to respond during the provided grant within the COT. In such an instance, the mobile communication device 110 may miss an opportunity to transmit Msg3 in the channel occupancy time 855 acquired by the wireless base station 160. The mobile communication device 110 may use LBT Cat-4 for this additional transmission opportunity. Note that the attributes for this grant opportunity may be different (e.g. lower MCS etc.) due to the activity of co-channel nodes (hidden to the UE) after the gNB-owned (acquired) channel occupancy time 855.

Thus, in accordance with further embodiments, the wireless base station 160 receives a first wireless message 350 communicated from the mobile communication device 110. In response to receiving the first wireless message 350, the wireless base station 160 acquires access rights to communicate over shared wireless channel in a respective channel occupancy time 855.

During the channel occupancy time 855, the wireless base station 160 communicates a wireless response message 802 from the wireless base station 160 over the acquired shared wireless channel to the mobile communication device 110.

In one nonlimiting example embodiment, the wireless response message 802 includes scheduling of a subsequent wireless message from the mobile communication device 110 to the wireless base station 160 within the respective channel occupancy time 855 associated with the shared wireless channel acquired by the wireless base station 160. Thus, the channel occupancy time 855 associated with acquisition of the shared wireless channel by the wireless base station 160 supports communications from the wireless base station 160 to the mobile communication device 110 as well as one or more communications from the mobile communication device 110 to the wireless base station 160.

In accordance with still further embodiments, as previously discussed, the wireless base station 160 communicates the wireless response message 802 to the mobile communication device 110 in response to an inability of the wireless base station 160 to decode successfully at least a portion of the received wireless message 350.

Further, as previously discussed, the wireless base station 160 can be configured to perform any suitable function to acquire the shared wireless channel. For example, in one embodiment, the wireless base station 160 implements a listen before talk protocol at the wireless base station 160 to acquire the access rights to communicate over the shared wireless channel in the respective channel occupancy time 855.

In response to detecting an inability of the communication manager 141 of the wireless base station 160 to decode at least a portion (such as PUSCH portion) of the received wireless message 350, the wireless base station 160 initiates a fallback from a first channel access procedure (such as a 2 step channel access procedure) selected by the mobile communication device 110 to a second channel access procedure (such as a 4 step channel access procedure).

The inability of the wireless base station 160 to decode at least a portion of the received wireless message 350 can occur for any of multiple reasons. For example, in one embodiment, the inability occurs in response to high channel occupancy of other wireless stations wirelessly communicating in the wireless network environment in which the mobile communication device 110 and the wireless base station 160 reside.

In still further embodiments, in addition to scheduling a subsequent wireless message 803 from the mobile communication device 110 to the wireless base station 160 in the wireless response message 802, the wireless base station 160 can be configured to provide an additional uplink grant (allocation) of wireless resources to the mobile communication device 110 in case the mobile communication device 110 is unable to communicate the subsequent message 803 within the channel occupancy time 855 allocated to the wireless base station 160. As previously discussed, this alleviates the mobile communication device 110 from having to perform a listen before talk protocol to acquire the shared wireless channel again.

Figure 9:
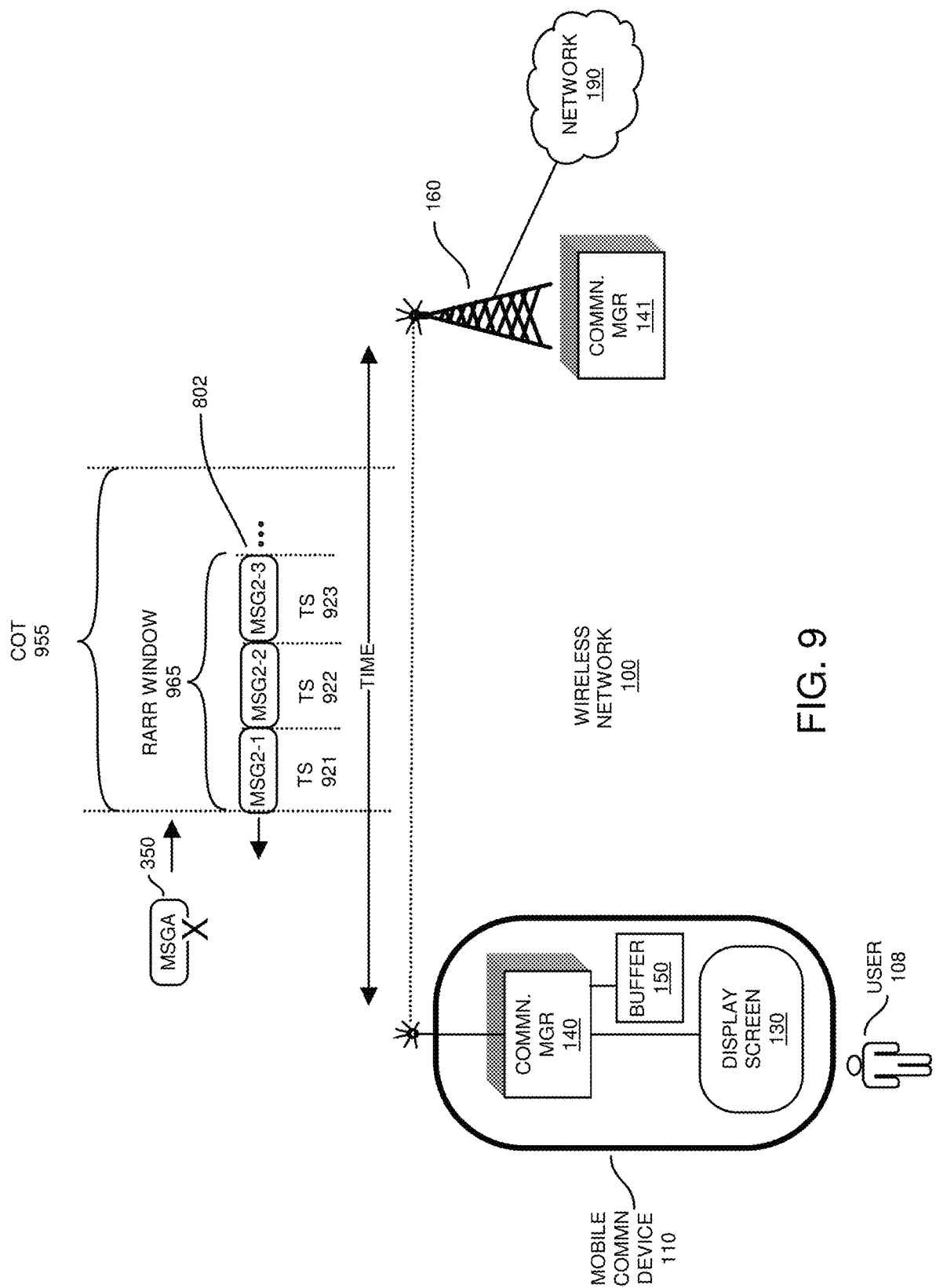
FIG. 9 is an example diagram illustrating a repetition window according to embodiments herein.

FIG. 9 is an example diagram illustrating a repetition window according to embodiments herein.

In accordance with further embodiments, if the wireless base station (gNB) successfully decodes the preamble (PRACH portion) of the wireless request message 350 but fails to decode the PUSCH portion in the wireless request message 350 (such as MsgA) due to a condition such as excessive co-channel interference, the wireless base station 160 (such as gNB) transmits a fallbackRAR by proper adjustment of the existing parameters (such as Modulation Coding Scheme) associated with sending a reply message 802 such as Msg2.

In accordance with further embodiments, additionally, or alternatively, to increase the likelihood of wireless request message 802 (Msg 2 of the fallback 4 step channel access procedure) being successfully decoded by the mobile communication device 110, the communication manager 141 of the wireless base station 160 (gNB) may duplicate transmission of Msg2 (such as a notification) in the same slot or next slot(s), but within a respective RAR repetition window 965 (RARR window, which have any number of slots spectrum access system 2, 3, 4, etc., slots). In one embodiment, Msg2 is entirely repeated (both PDCCH and PDSCH parts). In another embodiment the second portion of Msg2 (PDSCH) gets repeated, and in this case the presence of repeated portion of Msg2 (the PDSCH portion) may be notified by the base station within the control portion (PDCCH portion).

In accordance with further embodiments, the message (msg2) from the wireless base station includes a first portion (PDCCH portion) and a second portion (PDSCH portion). There is a chance that the second portion is erroneously received by the mobile communication device. Hence, the second portion is repeated in the RARR window. In one embodiment, within the first portion of the message (such as msg2) from the wireless base station to the mobile communication device, the wireless base station indicates whether and where in the second portion a corresponding communication or the entire second portion is repeated.

More specifically, in this example embodiment, the wireless base station 160 acquires the channel occupancy time 955 to communicate to the mobile communication device 110. Within the window 965, the wireless base station 160 transmits reply message 802 to the mobile communication device 110.

In this example embodiment, the message 802 includes repeated communications of message2 portion in each of the multiple timeslots. For example, the wireless base station 160 communicates msg2-1 in timeslot 921; the wireless base station 160 communicates msg2-2 in timeslot 922; the wireless base station 160 communicates msg2-3 in timeslot 923; etc.

In one embodiment, each of the message information msg2-1, msg2-2, msg2-3, etc., are identical. Replication and transmission of this same data within the window 965 increases a likelihood that the mobile communication device 110 receives and is able to decode the message 802.

In yet further specific embodiments, if the mobile communication device 110 successfully decodes the PDCCH message (with expected RA-RNTI) in the wireless message 802 but fails decoding the PDSCH in the wireless message 802, instead of initiating a new RACH procedure, the mobile communication device 110 waits the duration of the RARR window 960. Upon detection of additional PDCCH information with expected RA-RNTI in the replicated timeslots, the mobile communication device 110 performs decoding of the related PDSCH and may perform combining two or more of the received PDSCH resources in the multiple slots 921, 922, 9232, etc., to reproduce a respective message.

For instances in which the wireless base station 160 is configured to support repeated transmission of the same message information in the wireless message 802, the mobile communication device 110 continues performing the same and may combine multiple PDSCH resources where each has an associated PDCCH with the expected RA-RNTI.

Thus, further embodiments herein include a wireless base station 160 operative to receive a wireless request message 350 communicated from a mobile communication device 110. In response to the wireless request message information 350, the wireless base station 160: i) acquires access rights to communicate over a shared wireless channel in a respective channel occupancy time 955, and ii) in the acquired shared wireless channel and channel occupancy time 955, the wireless base station 160 communicates a response message 802 from the wireless base station 160 to the mobile communication device 110.

In one embodiment, as previously discussed, the response message 802 includes repeated transmission of a corresponding wireless communication (such as msg2) in each of multiple timeslots 921, 922, 923, etc.

More specifically, in this example embodiment, timeslot 921 includes a first instance of a particular message (such as msg2-1); timeslot 922 includes a second instance of the particular message (such as msg2-2); timeslot 923 includes a third instance of a particular message (such as msg2-3); and so on.

Thus, in one embodiment, the wireless base station 160 communicates the particular message (wireless communication msg2 or any portion thereof) multiple times in different timeslots of a so-called RAR (Random Access Response) repetition window 965 in response to an inability of the wireless base station 160 to decode at least a portion of the received wireless request message information 350 (such as a wireless request message).

As previously discussed, the wireless base station 160 can be configured to perform any suitable function to acquire the shared wireless channel. For example, in one embodiment, as mentioned, the wireless base station 160 implements a listen before talk protocol at the wireless base station 160 to acquire the access rights to communicate over the shared wireless channel in a respective channel occupancy time 955.

In yet further embodiments, in response to detecting an inability of the communication manager 141 at the wireless base station 160 to decode at least a portion of the received wireless request message information 350 (wireless message), the wireless base station 160 initiates a fallback from the selected first channel access procedure (as selected by the mobile communication device 110) to a second channel access procedure as selected by the wireless base station 160.

The inability of the wireless base station 160 to decode at least a portion of the received wireless message 350 can occur for any of multiple reasons. For example, in one embodiment, the inability occurs in response to high channel occupancy of other wireless stations wirelessly communicating in the wireless network environment in which the mobile communication device 110 and the wireless base station 160 reside.

In accordance with further embodiments, wireless base station 160 receives a first wireless connection request message 350 communicated from a mobile communication device 110. In response to receiving the first wireless connection request message 350 (such as message A in a 2 step channel access procedure), the wireless base station 160 acquires access rights to communicate over a shared wireless channel (as specified by the wireless resource allocation information 125). Via the acquired shared wireless channel, in addition to or in lieu of communicating a repetitive notification in timeslots 921, 922, 923, etc., the wireless base station 160 adjusts modulation coding of communicating a wireless response message 802 from the wireless base station 160 to the mobile communication device 110.

In yet further embodiments, the wireless base station 160 adjusts modulation coding of the wireless response message 802 in response to a failure of the wireless base station 160 decoding the first wireless message 350. More specifically, if the wireless base station 160 successfully decodes the preamble in wireless connection request message 350 but fails to decode PUSCH information in the wireless connection request message 350 due to presence of wireless interference in the network environment 100, the wireless base station 160 initiates a fall back to the second channel access procedure and communication of the reply message 802 at an appropriate modulation coding rate to overcome wireless interference.

In a similar manner as previously discussed, the wireless response message 802 can be configured to include repeated transmission of a particular communication in timeslots 921, 922, 923, etc., in the window 965. Duplication and transmission of the same data (such as a wireless communication) in timeslots 921, 922, 923, etc., increases a likelihood that the mobile communication device 110 will receive the corresponding duplicated message transmitted from the mobile communication device 110 to the wireless base station 160.

Figure 10:
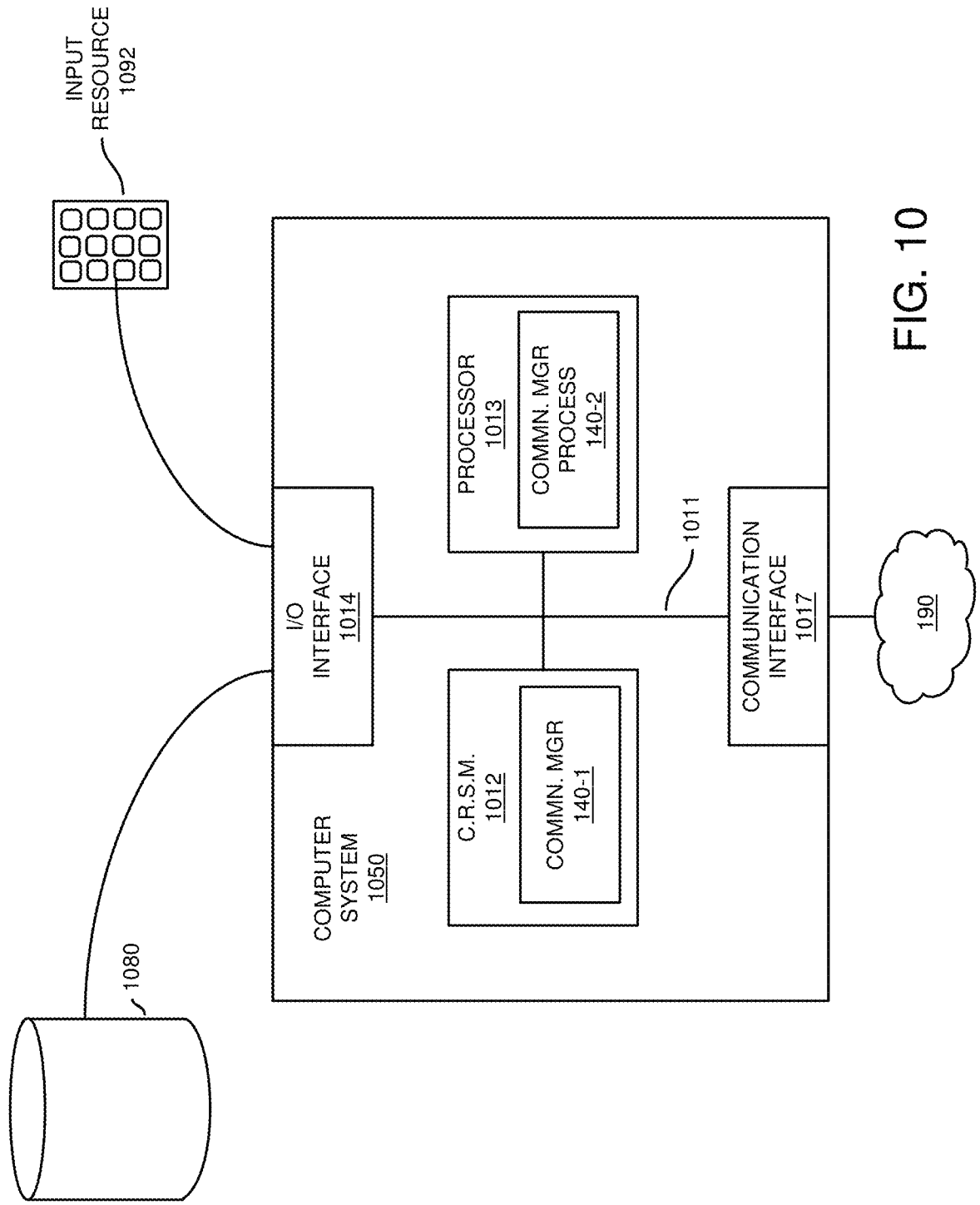
FIG. 10 is an example diagram illustrating example computer hardware and software operable to execute one or more operations according to embodiments herein.

FIG. 10 is an example block diagram of a computer system for implementing any of the operations as previously discussed according to embodiments herein.

Any of the resources (such as communication manager 140, communication manager 141, mobile communication device 110, wireless base station 160, etc.) as discussed herein can be configured to include computer processor hardware and/or corresponding executable instructions to carry out the different operations as discussed herein.

As shown, computer system 1050 of the present example includes interconnect 1011 coupling computer readable storage media 1012 such as a non-transitory type of media (which can be any suitable type of hardware storage medium in which digital information can be stored and or retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with communication manager application 140-1 (e.g., including instructions) in a respective wireless station to carry out any of the operations as discussed herein.

During operation of one embodiment, processor 1013 accesses computer readable storage media 1012 via the use of interconnect 1011 in order to launch, run, execute, interpret or otherwise perform the instructions in communication manager application 140-1 stored on computer readable storage medium 1012. Execution of the communication manager application 140-1 produces communication manager process 140-2 to carry out any of the operations and/or processes as discussed herein.

Those skilled in the art will understand that the computer system 1050 can include other processes and/or software and hardware components, such as an operating system that controls allocation and use of hardware resources to execute communication manager application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via the flowchart in FIG. 11. Note that the steps in the flowcharts below can be executed in any suitable order.

Figure 11:
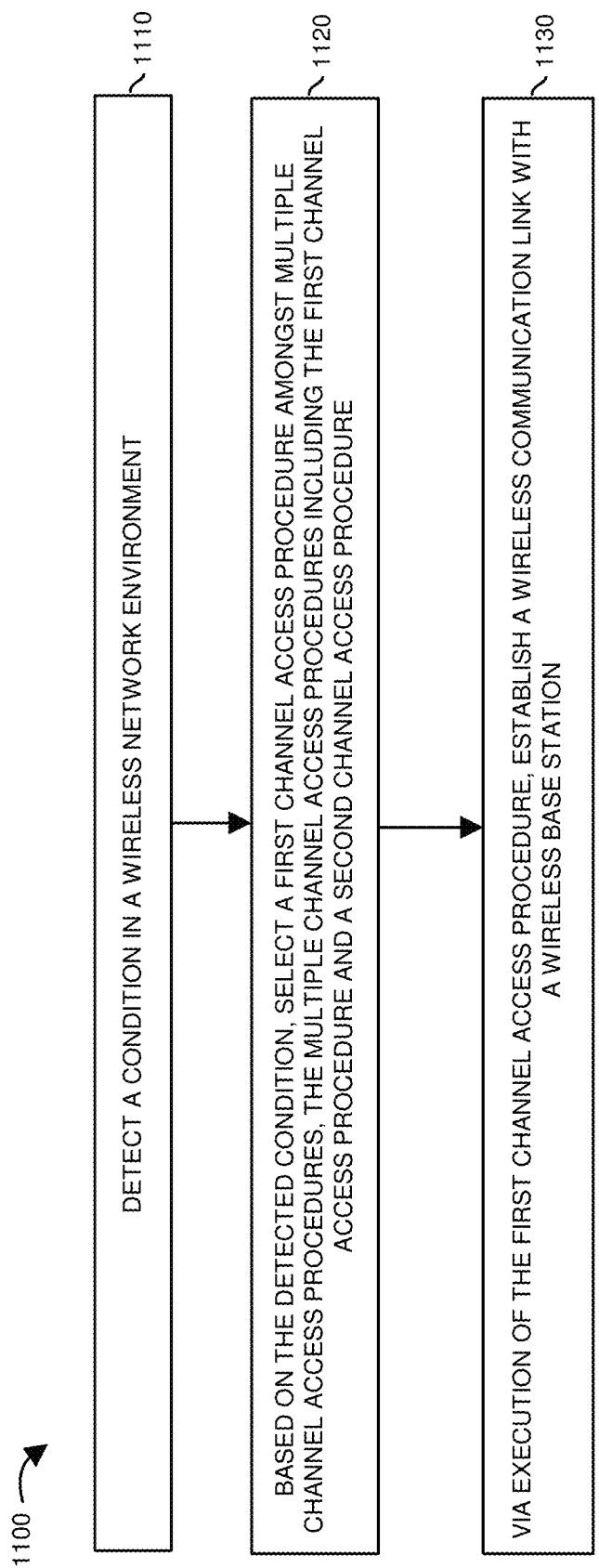
FIG. 11 is an example diagram illustrating a method according to embodiments herein.

FIG. 11 is a flowchart 1100 illustrating an example method according to embodiments herein. Note that there will be some overlap with respect to concepts as discussed above.

In processing operation 1110, the mobile communication device 110 (user equipment) detects occurrence of a condition in a wireless network environment 100.

In processing operation 1110, based on the detected condition, the mobile communication device 110 selects a first channel access procedure amongst multiple channel access procedures. In one embodiment, the multiple channel access procedures from which the mobile communication device 110 makes a selection includes the first channel access procedure and a second channel access procedure.

In processing operation 1110, via execution of the first channel access procedure, the mobile communication device 110 initiates establishing a wireless communication link with a wireless base station 160.

Figure 12:
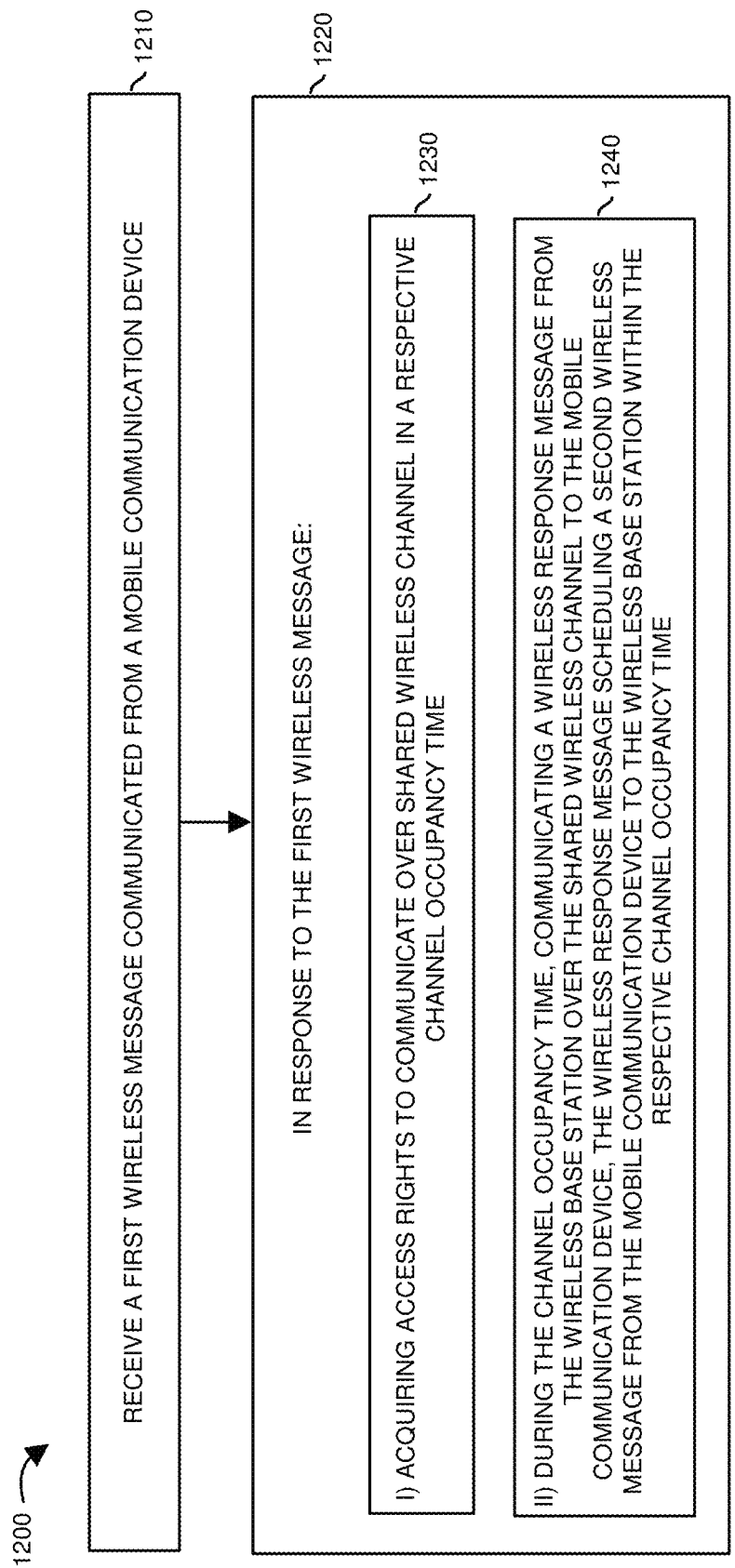
FIG. 12 is an example diagram illustrating a method according to embodiments herein.

FIG. 12 is a flowchart 1200 illustrating an example method according to embodiments herein. Note that there will be some overlap with respect to concepts as discussed above.

In processing operation 1210, the wireless base station 160 receives a first wireless message (such as wireless request message information 350) communicated from the mobile communication device 110.

In processing operation 1220, in response to receiving the first wireless message (such as wireless request message information 350), the wireless base station 160: acquires access rights to communicate over a shared wireless channel in a respective channel occupancy time in sub-processing operation 1230.

In sub-processing operation 1240, during the channel occupancy time, the wireless base station 160 communicates a wireless response message from the wireless base station 160 over the acquired shared wireless channel to the mobile communication device 110.

As previously discussed, in one embodiment, the wireless response message from the wireless base station 160 schedules a second wireless message from the mobile communication device to the wireless base station within the respective channel occupancy time associated with the shared channel acquired by the wireless base station 160.

Figure 13:
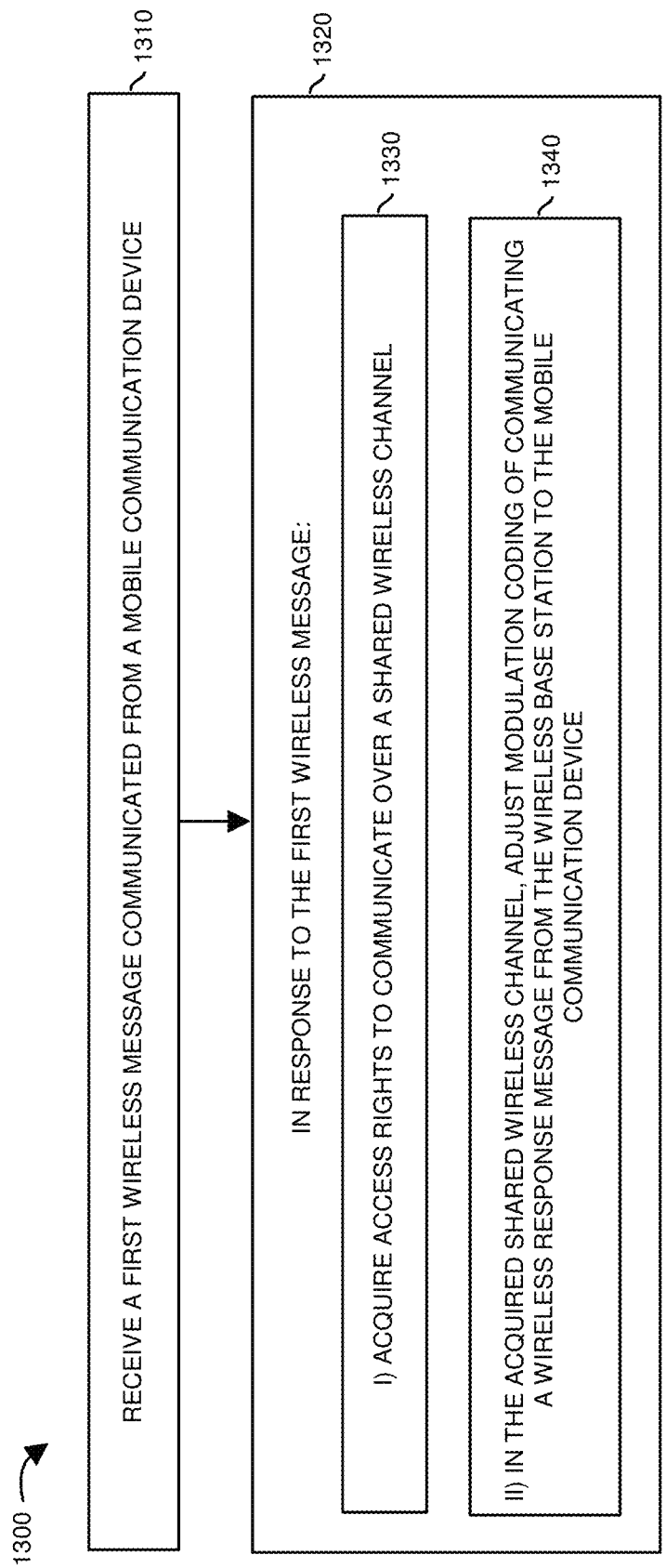
FIG. 13 is an example diagram illustrating a method according to embodiments herein.

FIG. 13 is a flowchart 1300 illustrating an example method according to embodiments herein. Note that there will be some overlap with respect to concepts as discussed above.

In processing operation 1310, the wireless base station 160 receive a first wireless message (such as wireless request message information 350) communicated from the mobile communication device 110.

In processing operation 1320, in response to the first wireless message, the wireless base station 160: i) acquires access rights to communicate over a shared wireless channel in sub-processing operation 1330, and ii) in the acquired shared wireless channel, in sub-processing operation 1340, adjusts modulation coding of communicating a wireless response message from the wireless base station 160 to the mobile communication device 110.

Figure 14:
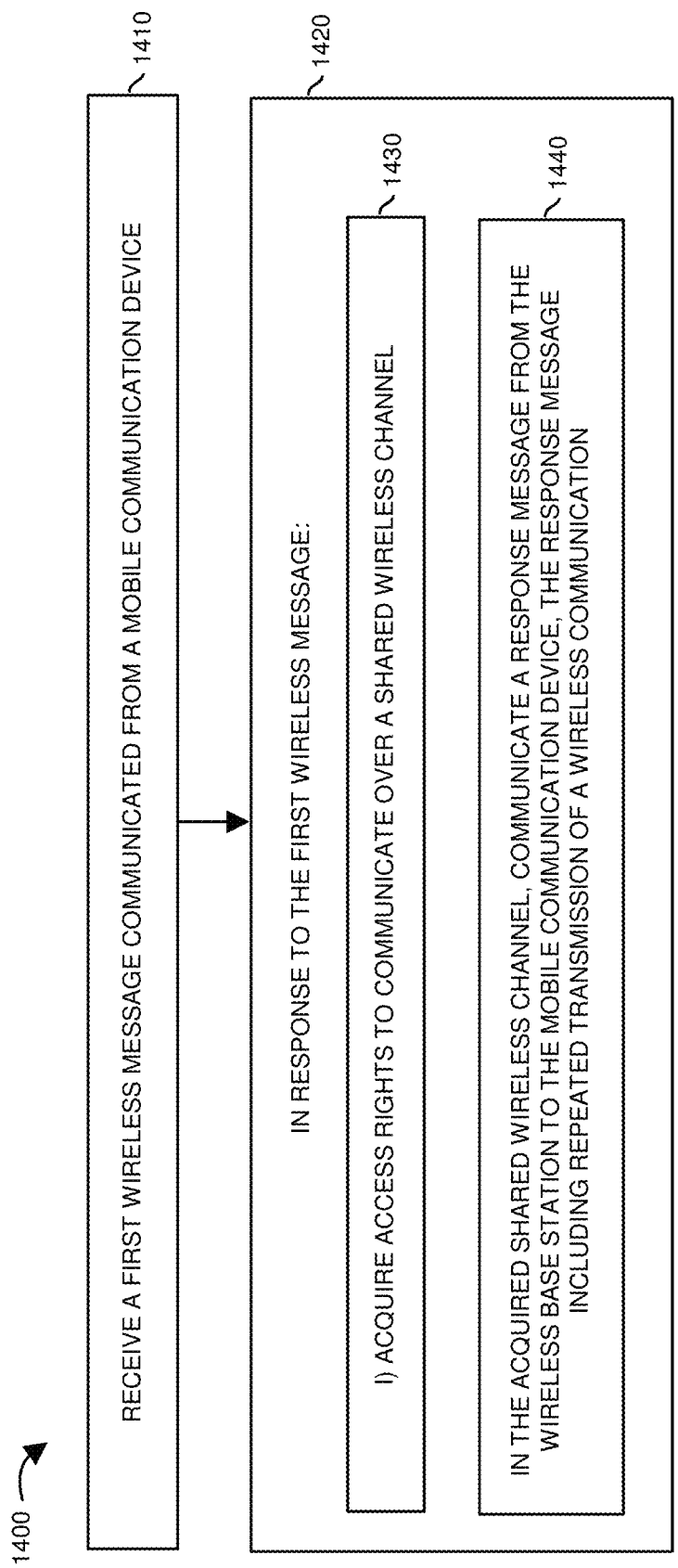
FIG. 14 is an example diagram illustrating a method according to embodiments herein.

FIG. 14 is a flowchart 1400 illustrating an example method according to embodiments herein. Note that there will be some overlap with respect to concepts as discussed above.

In processing operation 1410, the wireless base station 160 receives a first wireless message (such as wireless request message information 350) communicated from the mobile communication device 110.

In processing operation 1420, in response to the first wireless message, the wireless base station 160: i) acquires access rights to communicate over a shared wireless channel in sub-processing operation 1430, and ii) in the acquired shared wireless channel, in sub-processing operation 1440, communicates a response message 930 from the wireless base station 160 to the mobile communication device 110. In one embodiment, the response message 930 includes repeated transmission of a wireless communication such as a first instance of a wireless communication 930-1, second instance of the wireless communication 930-2, third instance of the wireless communication 930-3, etc.

Note again that techniques herein are well suited to facilitate use of a shared wireless bandwidth amongst different types of wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at a wireless base station in a wireless network environment:
        receiving a first wireless message communicated from a mobile communication device, the first wireless message being a wireless connection request message to communicate with the wireless base station; and
        in response to the first wireless message: i) acquiring access rights to communicate over a shared wireless channel in a respective channel occupancy time; and ii) during the respective channel occupancy time, communicating a wireless response message from the wireless base station over the shared wireless channel to the mobile communication device, the wireless response message scheduling a second wireless message for transmission from the mobile communication device to the wireless base station within the respective channel occupancy time.

2. The method as in claim 1 further comprising:
    communicating the wireless response message to the mobile communication device in response to an inability of the wireless base station to perform errorless decoding of at least a portion of the received first wireless message.

3. The method as in claim 1 further comprising:
implementing a listen before talk protocol at the wireless base station to acquire the access rights to communicate over the shared wireless channel in the respective channel occupancy time.

4. The method as in claim 1 further comprising:
at the wireless base station, initiating a fallback from a first channel access procedure selected by the mobile communication device to a second channel access procedure in response to detecting an inability of the wireless base station to decode at least a portion of the received first wireless message.

5. The method as in claim 4, wherein the inability occurs in response to high channel occupancy of other wireless stations wirelessly communicating in the wireless network environment in which the mobile communication device and the wireless base station reside.

6. The method as in claim 1 further comprising:
in addition to scheduling the second wireless message via the wireless response message, providing an additional uplink grant of wireless resources to the mobile communication device in a case in which the mobile communication device cannot communicate the second wireless message to the wireless base station within the channel occupancy time.

7. The method as in claim 1, wherein the first wireless message is a message transmitted from the mobile communication device in accordance with a first channel access procedure; and
wherein the wireless response message is transmitted in accordance with a second channel access procedure different than the first channel access procedure.

8. The method as in claim 7, wherein the first channel access procedure is a 2-step channel access procedure; and
wherein the second channel access procedure is a 4-step channel access procedure.

9. The method as in claim 8, wherein the first wireless message is a MsgA of the first channel access procedure, the MsgA being a schedule request to communicate with the wireless base station; and
wherein the wireless response message is a Msg2 of the second channel access procedure, the Msg2 granting the mobile communication device use of the shared wireless channel to communicate with the wireless base station.

10. The method as in claim 9 further comprising:
at the wireless base station, in the respective channel occupancy time, receiving a second wireless message communicated from the mobile communication device.

11. The method as in claim 10, wherein the second wireless message is a Msg3 communication of the 4-step channel access procedure.

12. The method as in claim 10 further comprising:
producing the wireless response to include supplemental allocation of wireless resources to the mobile communication device to communicate with the wireless base station outside of the respective channel occupancy time.

13. The method as in claim 12, wherein the supplemental allocation of wireless resources to the mobile communication device is allocated during a condition in which the mobile communication devices is unable to complete communication of a second wireless communication to the wireless base station within the respective channel occupancy time.

14. The method as in claim 13, wherein supplemental allocation of the wireless resources alleviates the mobile communication device from having to implement a listen before talk function to complete communication of the second wireless communication to the wireless base station.

15. The method as in claim 1, wherein receiving the first wireless message and communicating the wireless response message includes:
switching over from a first channel access procedure of receiving the first wireless message to a second channel access procedure of transmitting the wireless response message.

16. The method as in claim 1, wherein the first wireless message includes a preamble and the wireless connection request message; and
wherein the wireless base station communicates the wireless response message to the mobile communication device in response to an inability to decode the wireless connection request message.

17. The method as in claim 1, wherein the scheduling of the second wireless message from the mobile communication device to the wireless base station as indicated by the wireless response message grants use of the shared wireless channel to the mobile communication device in response to the wireless connection request message requesting use of the shared wireless channel.

18. Computer-readable storage hardware having instructions stored thereon, the instructions, when carried out by computer processor hardware, cause the computer processor hardware to:
receive a first wireless message communicated from a mobile communication device;
in response to a failure associated with decoding the first wireless message:
acquire access rights to communicate over a shared wireless channel in a respective channel occupancy time; and
communicate a wireless response message from the wireless base station to the mobile communication device, the wireless response message scheduling a second wireless message from the mobile communication device to the wireless base station within the respective channel occupancy time.

* * * * *